United States Patent
O'Neill et al.

(10) Patent No.: US 7,362,727 B1
(45) Date of Patent: *Apr. 22, 2008

(54) TELECOMMUNICATIONS ROUTING

(75) Inventors: Alan W O'Neill, Ipswich (GB); Mathew S Corson, Kensington, MD (US)

(73) Assignee: British Telecommunications public limited company, London (GB)

(*) Notice: Subject to any disclaimer, the term of this patent is extended or adjusted under 35 U.S.C. 154(b) by 1115 days.

This patent is subject to a terminal disclaimer.

(21) Appl. No.: 10/018,485

(22) PCT Filed: Jul. 19, 2000

(86) PCT No.: PCT/GB00/02800

§ 371 (c)(1),
(2), (4) Date: Dec. 19, 2001

(87) PCT Pub. No.: WO01/06707

PCT Pub. Date: Jan. 25, 2001

(30) Foreign Application Priority Data

Jul. 19, 1999 (EP) .................. 99305688

(51) Int. Cl.
*H04Q 7/20* (2006.01)
*H04J 3/24* (2006.01)
*G06F 15/16* (2006.01)
*G06F 15/173* (2006.01)

(52) U.S. Cl. .................. 370/331; 370/338; 370/349; 455/436; 455/445; 709/230; 709/239

(58) Field of Classification Search ................ 370/331, 370/338, 349; 455/436, 445; 709/230, 239
See application file for complete search history.

(56) References Cited

U.S. PATENT DOCUMENTS

| | | |
|---|---|---|
| 5,117,422 A | 5/1992 | Hauptschein et al. |
| 5,371,738 A | 12/1994 | Moelard et al. |
| 5,375,140 A | 12/1994 | Bustamante et al. |
| 5,384,826 A | 1/1995 | Amitay |
| 5,400,338 A | 3/1995 | Flammer |
| 5,528,583 A | 6/1996 | Acampora et al. |
| 5,533,026 A * | 7/1996 | Ahmadi et al. ............. 370/349 |
| 5,590,126 A * | 12/1996 | Mishra et al. ............. 370/329 |
| 5,623,534 A | 4/1997 | Desai et al. |

(Continued)

FOREIGN PATENT DOCUMENTS

AU         5424496         10/1996

(Continued)

OTHER PUBLICATIONS

"Tutorial: Mobile Networking Through Mobile IP", Charles E. Perkins, IEEE Internet Computing Oneline, 1997.

(Continued)

*Primary Examiner*—Alpus H. Hsu
(74) *Attorney, Agent, or Firm*—Nixon & Vanderhye PC

(57) ABSTRACT

Routing of packets is controlled in a connectionless routing protocol network including an infrastructure of packet switching nodes interconnected by packet transport links, and a plurality of access nodes to which a routing path, defined by data held in packet switching nodes located along said routing path, may be directed in the infrastructure for a given network address.

22 Claims, 26 Drawing Sheets

U.S. PATENT DOCUMENTS

| | | | |
|---|---|---|---|
| 5,729,549 A | 3/1998 | Kostreski et al. | |
| 5,751,707 A | 5/1998 | Voit et al. | |
| 5,754,546 A | 5/1998 | Voit et al. | |
| 5,822,324 A | 10/1998 | Kostresti et al. | |
| 6,002,677 A | 12/1999 | Javitt et al. | |
| 6,038,450 A | 3/2000 | Brink et al. | |
| 6,081,524 A | 6/2000 | Chase et al. | |
| 6,094,437 A | 7/2000 | Loehndorf et al. | |
| 6,130,898 A | 10/2000 | Kostreski et al. | |
| 6,137,791 A * | 10/2000 | Frid et al. | 370/352 |
| 6,160,804 A * | 12/2000 | Ahmed et al. | 370/349 |
| 6,256,300 B1 * | 7/2001 | Ahmed et al. | 370/331 |
| 6,407,988 B1 * | 6/2002 | Agraharam et al. | 370/328 |
| 6,434,134 B1 * | 8/2002 | La Porta et al. | 370/338 |
| 6,473,411 B1 | 10/2002 | Kumaki et al. | |
| 6,487,406 B1 * | 11/2002 | Chang et al. | 455/422.1 |
| 6,496,505 B2 * | 12/2002 | La Porta et al. | 370/392 |
| 6,512,754 B2 * | 1/2003 | Feder et al. | 370/338 |
| 6,611,547 B1 * | 8/2003 | Rauhala | 370/331 |
| 6,614,765 B1 * | 9/2003 | Bruno et al. | 370/255 |
| 6,654,359 B1 * | 11/2003 | La Porta et al. | 370/328 |
| 6,763,007 B1 * | 7/2004 | La Porta et al. | 370/331 |
| 6,842,462 B1 * | 1/2005 | Ramjee et al. | 370/466 |
| 7,085,241 B1 | 8/2006 | O'Neill et al. | |
| 7,161,929 B1 | 1/2007 | O'Neill et al. | |
| 7,177,646 B2 * | 2/2007 | O'Neill et al. | 455/450 |
| 7,239,618 B1 * | 7/2007 | La Porta et al. | 370/331 |
| 2002/0089958 A1 | 7/2002 | Feder et al. | |
| 2002/0141360 A1 | 10/2002 | Baba et al. | |

FOREIGN PATENT DOCUMENTS

| | | |
|---|---|---|
| AU | 5424696 | 10/1996 |
| EP | 0660632 A2 | 6/1995 |
| EP | 0737019 A2 | 10/1996 |
| EP | 0740440 A2 | 10/1996 |
| EP | 0777396 A1 | 6/1997 |
| EP | 0 829 985 | 3/1998 |
| EP | 0 835 034 | 4/1998 |
| EP | 0 862 344 | 9/1998 |
| EP | 0883266 A2 | 12/1998 |
| EP | 0889667 A1 | 1/1999 |
| EP | 0 902 551 | 3/1999 |
| EP | 1 011 241 | 6/2000 |
| JP | 10093634 | 4/1998 |
| JP | 11178036 | 7/1999 |
| WO | WO 95/30192 | 11/1995 |
| WO | 96/05704 | 2/1996 |
| WO | 96/28903 | 9/1996 |
| WO | 96/28904 | 9/1996 |
| WO | WO 98/47302 | 10/1998 |
| WO | 00/44133 | 7/2000 |
| WO | WO 01/06717 | 1/2001 |
| WO | WO 01/06732 | 1/2001 |
| WO | WO 01/61394 | 8/2001 |
| WO | WO 01/99457 | 12/2001 |

OTHER PUBLICATIONS

"IP Micro-Mobility Support Using HAWAII", R. Ramjee, T. La Porta, S. Thuel, K. Varadhan, Feb. 19, 1999, posted on the Internet Engineering Taskforce Internet site at http://www.ietf.org/internet-drafts/draft-rimjee-micro-mobility-hawaii-00.txt.

"A Highly Adaptive Distributed Routing Algorithm for Mobile Wireless Networks" Vincent D. Park and M Scott Corson, Proceedings of INFOCOM '97, Apr. 7-11, Kobe, Japan.

"A Performance Comparison of the Temporally-Ordered Routing Algorithm and Ideal Link-State Routing" Vincent D Park and M Scott Corson, Proceedings of ISCC '98, Jun. 30-Jul. 2, 1999.

"Architectural Considerations for Mobile Mesh Networking", S. Corson et al, May 1996.

Highly Dynamic Destination-Sequenced Distance-Vector Routing (DSDV) for Mobile Computers:, Charles E, Perkins et al., ACM SIGCOMM 1994.

"Providing Continuous Network Access to Mobile Hosts using TCP/IP", Charles Perkins, Computer Networks and ISDN Systems vol. 26 (1993), pp. 357-369.

"Cellular IP—A New Approach to Internet Host Mobility", A.G. Valko, Jan. 199, ACM Comput. Commun. Review.

IP Addressing and Routing in a Local Wireless Network:, Danny Cohen, Jonathan B. Postel, Raphael Rom, IEEE INFOCOM 1992, pp. 626-632.

"Hawaii: A Domain-based Approach for Supporting Mobility in Wide-Area Wireless Networks", R. Ramjee, T. La Porta, S. Thuel, and K. Varadhan, Proceedings of the International Conference on Networking Protocols (ICNP), Nov. 3, 1999, pp. 283-292.

"A protocol for seamless communication in a picocellular network", R. Ghai and S. Singh, May 1994, In Proc. IEEE Supercomm/ICC, pp. 192-196.

"Multicast Communications—Protocols and Applications", Ralph Wittman, Martina Zitterbart, May 12, 2000, Morgan Kaufman Publishers, San Diego, pp. 105-121.

"An Effective Spanning Tree Algorithm for a Bridged LAN", N.F. Huang and Y.C. Cheng, Mar. 1992, International Workshop on Advanced Communications and Applications for High Speed Networks (IWACA '92), Munich, Germany, pp. 43-49.

"Edge Mobility Architecture", A. O'Neill, G. Tsirtis, S. Corson, Jul. 2000, posted on http://www.comet.columbia.edu/micomobility/pub/draft-oneill-ema-02.txt.

"A two-phase inter-switch handoff scheme for wireless ATM Networks", K. Salah, E. Drakoponios, Oct. 1998, IEEE ATM 98 Workshop Proceedings, pp. 708-713.

"Adaptive Routing in Burroughs Network Architecture", J. Rosenberg, Aug. 17, 1987, Computer Communications Review, US Association for Computing Machinery, vol. 17, No. 5, pp. 173-184.

"Paging Support for IP mobility using HAWAII", R. Ramjee, T. La Porta, L. Li, Jun. 25, 1999, posted on the Internet Engineering Taskforce Internet site at http://www.ietf.org/internet-drafts/draft-ietf-mobileip-paging-hawaii-00.txt.

"P-MIP: Minimal Paging Extensions for Mobile IP", X. Zhang, J. Castellanos, A. Campbell, K. Sawada, M. Barry, Jul. 20000, posted on the Internet Engineering Taskforce Internet site at http://www.ietf.org/internet-drafts/draft-zhang-pimp-00.txt.

"Source-Specific Multicast for IP", H. Holbrook, B. Cain, Mar. 9, 2000, posted on the Internet Engineering Taskforce Internet site at http://www.ietf.org/internet-drafts/draft-holbrook-ssm-00.txt.

"Cellular IP", A. Campbell, J. Gomez, C-Y Wan, S, Kim, Z. Turanyi, A. Valko, Dec. 1999, posted on the Internet Engineering Taskforce Internet site at http://www.ietf.org/internet-drafts/draft-ietf-mobileip-cellularip-00.txt.

"Host Specific Routing", Alan O'Neill, Hongyi Li, Nov. 2000, posted on the Internet Engineering Taskforce Internet site at http://www.ietf.org/internet-drafts/draft-oneill-li-hsr-00.txt.

"State Transfer between Access Routes during Handoff", A. O'Neill, G. Tsirtsis, S. Corson, Aug. 2000, posted on the Internet Engineering Taskforce Internet site at http://www.ietf.org/internet-drafts/draft-oneill-handoff-state-00.txt.

"IPv4 over Mobile IPv6 for Dual Stack nodes", G. Tsirtsis, A. O'Neill, S. Corson, Aug. 2000, posted on the Internet Engineering Taskforce Internet site at http://www.ietf.org/internet-drafts/draft-tsirtsis-v4-over-mipv6-00.txt.

"Generalized IP Handoff", A. O'Neill, G. Tsirtsis, S. Corson, Aug. 2000, posted on the Internet Engineering Taskforce Internet site at http://www.ietf.org/internet-drafts/draft-oneill-craps-handoff-00.txt.

"EMA Enhanced Mobile IPv6/IPv4", O'Neill, G. Tsirtsis, S. Corson, Jul. 2000, posted on the Internet Engineering Taskforce Internet site at http://www.ietf.org/internet-drafts/draft-oneill-ema-mip-00.txt.

"Host Extensions for IP Multicasting", S. Deering, Aug. 1989, Internet Engineering Taskforce Request for Comment (RFC) 1112, posted on the Internet Engineering Taskforce Internet site at http://www.ietf.org/rfc/rfc1112.txt.

"IP Mobility Support", C. Perkins, Oct. 1996, Internet Engineering Taskforce Request for Comment 2002, posted on the Internet Engineering Taskforce Internet site at http://www.ietf.org/rfc/rfc2002.txt.

"On dynamically adapting registration areas to user mobility patterns in PCS networks", G. Varsamopoious, S.K. Gupta, Sep. 1999, In Proc. Int'l Workshop on Collaboration and Mobile Computing (IWCMC'99), Aizu, Japan.

"Mobile user registration in cellular systems with overlapping location areas", D. Gu and S.S. Rappaport, May 1999, Proceedings of the 50th Vehicular Technology Conference, pp. 802-806.

"Extending Mobile IP with adaptive individual paging: a performance analysis", C. Castelluccia, 2000, In Proc. IEEE Symposium on Computer and Communications, pp. 113-118.

"A hierarchial multiresolution registration structure for mobility tracking", L. Tassiulas, F. Anjum, Sep. 1996, Proceedings of the 5th International Conference on Universal Personal Communications, Boston, MA.

"Distributed algorithms for generating loop-free routes in networks with frequently changing topology", E. Gafni, D. Bertsekas, Jan. 1981, IEEE Transactions on Communications, vol. 29, No. 1, pp. 11-18.

"Location tracking mechanisms for optimal mobility adaption", L. Tassiulas and F.M. Anjum, Oct. 1996, 34th Annual Allerton Conf. On Communications, Control and Computing, pp. 855-864.

Prosecution history of U.S. Appl. No. 10/537,896 downloaded from the USPTO Pair system on Oct. 23, 2007.

Prosecution history of U.S. Appl. No. 10/204,213 (abandoned) downloaded from USPTO Pair system on Oct. 23, 2007.

* cited by examiner

Fig.26.

| Host IP Address (Or Prefix) | Own Height | Neighbour I.D. | Neighbour Height | Link I.D. | Link State |
|---|---|---|---|---|---|
| IP1 | Hi (IP1) | w | H Niw (IP1) | L1 | u |
| | | x | H Nix (IP1) | L2 | D |
| | | y | H Niy (IP1) | L3 | D |
| | | z | H Niz (IP1) | L4 | — |
| IP2 | Hi (IP2) | w | H Niw (IP2) | L1 | D |
| | | x | H Nix (IP2) | L2 | u |
| | | y | H Niy (IP2) | L3 | u |
| | | z | H Niz (IP2) | L4 | — |
| ⋮ | ⋮ | ⋮ | ⋮ | ⋮ | ⋮ |

Fig.27.

| Host IP Address (Or Prefix) | Link ID |
|---|---|
| IP1 | L2 |
| IP2 | L1 |
| ⋮ | ⋮ |

TELECOMMUNICATIONS ROUTING

This application is the US national phase of international application PCT/GB00/02800 filed Jul. 19, 2000 which designated the U.S.

BACKGROUND

1. Technical Field

This invention relates to the routing of telecommunications signals. More particularly it relates to a method of routing such signals to both fixed and mobile telecommunications mediums, such that similar services can be used in the same way by users on either medium, and to allow system operators to reduce costs by greater commonality of switching and other network-based facilities. The present invention is concerned with the routing of packet-based communications such as those used in the "Internet" using the so-called "Internet Protocol" (IP).

2. Related Art

Present mobile medium systems are arranged such that a mobile user and associated systems collaborate at the interface with the network (typically the radio base station) to enable a mobile node to change from communicating with one base station to communicating with another, and to enable the network to update intelligence points of the new location. In cellular networks, these intelligence points are the Home and Visitor Location Registers (HLR and VLR), whilst in "Mobile IP" these locations are known as the Home and Foreign Agent. In both cases the "Visitor" Location Register or "Foreign" Agent maintains a record only of those users currently co-operating with base stations under their supervision, whilst their "Home" counterparts maintain a permanent record of their associated users, including a record of which VLR or Foreign Agent each one is currently working with. The address on an incoming message identifies the relevant HLR/Home Agent, to which reference is made to identify the appropriate VLR/Foreign Agent for more specific routing details. This allows minor changes in location to be effected within the VLR/Foreign Agent, locally to the user's current location without informing the HLR/Home Agent, which could be some distance away, thereby greatly reducing the signalling overhead.

The additional cost of mobility is the provision of this Home Agent/Foreign Agent interface, and especially with packet systems, the cost of tunneling (forwarding messages from one address to another), address exhaustion (the inability to re-use an address from which forwarding is taking place) and triangular routing.

In a fixed medium system, IP routing is based on the distribution of IP address blocks or prefixes, with an associated metric or route cost, from potential destinations to potential senders so that they and intermediate routers can determine the best next hop (neighbour router) towards that destination. These routes are pre-computed for all destinations in the network so that senders can immediately send information when generated. Pre-computation of routes, and deployed routing exchange technology, is possible when the sources and destinations have a fixed location, and communication bandwidth is rich enough for exhaustive exchange of routes. As the proportion of roaming increases however, such models break down and a more dynamic routing approach is required.

A proposal referred to as "HAWAII" was published 19 Feb., 1999 as an Internet-draft entitled "IP Micro-Mobility Support Using HAWAII", R. Ramjee, T. La Por, S. Thuel, K. Varadh, posted on the Internet Engineering Taskforce Internet site at HTTP://www.ietf.org/internet-drafts/draft-rimjee-micro-mobility-hawaii-00.txt. HAWAII uses specialised path set up schemes which install host-based forwarding entries in specific routers when in a routing domain to support intra-domain micro-mobility, and defaults to using "Mobile-IP" for inter-domain micro-mobility. In HAWAII, mobile hosts retain their network address while moving within the domain. The HAWAII architecture relies on a gateway router into a domain, referred to as the domain root router, to which default routes within the domain are directed. Each mobile host is assigned a home domain based on its permanent IP address. The path set up scheme updates a single routing path in a domain so that connectivity to the mobile host is possible both before and after handoff at the wireless link layer. Only routers located along a single routing path between the domain root router and the base station currently serving the mobile host have routing table entries for the mobile host's IP address. The remainder of the routers in the domain route any packets addressed to the mobile host upwards along default routes which rely on the tree-like nature of the routing domain, rooted at the domain root router, to provide an intersection with the downrouting towards the mobile host along the single routing path for which the routers have individual host entries for the mobile host's IP address.

In HAWAII, mobility between domains is supported by "Mobile IP" mechanisms. The home domain root router is designated as the Home Agent, and encapsulated IP packets are forwarded via the Foreign domain root router.

Drawbacks with the HAWAII proposals include the concentration of Mobile IP tunnels in few nodes in the core of the network, the domain root routers, such that failure of any of these nodes may result in large-scale failure of all Mobile IP state and associated sessions handled by the failing node. Furthermore, since all routing from outside the home domain into the home domain, and in the reverse direction, must occur via the home domain root router, failure of the home domain root router may also result in large-scale failure.

BRIEF SUMMARY

In accordance with one aspect of the invention, there is provided a method of controlling routing of packets in a connectionless routing protocol network including an infrastructure of packet switching nodes interconnected by packet transport links, and a plurality of access nodes to which a routing path, defined by data held in packet switching nodes located along said routing path, may be directed in said infrastructure for a given network address, said method comprising:

routing packets along a first routing path for a first network address, which routing path is directed to a first access node serving a mobile node using said first network address via a communications link;

designating an interface, other than the communications link to the mobile node from the first access node, on which to forward packets arriving along said first routing path;

altering routing in said infrastructure for said first network address to create a second routing path for said first network address, directed to said second access node;

altering routing in said infrastructure for said first network address to remove said first routing path not before said second routing path is created;

handing over the communications link of the mobile node, such that the second access node serves said mobile node; and routing packets to said second access node via said second routing path.

By designating a forwarding interface at the first access node, other than the communications link, and altering routing to remove the first routing path not before the second routing path is created, loss of packets within the infrastructure can be avoided, even where unknown timing differences exist between the loss of the communications link and the alteration of routing in the infrastructure.

BRIEF DESCRIPTION OF THE DRAWINGS

Further aspects and advantages of the invention will become apparent from embodiments which will now be described, by way of example only, with reference to the accompanying drawings, in which:

FIG. 26 schematically illustrates a routing protocol data table held in a routing node in accordance with an embodiment of the invention; and FIG. 27 illustrates a next-hop forwarding table held in the routing node in accordance with an embodiment of the invention.

DETAILED DESCRIPTION OF EXEMPLARY EMBODIMENTS

Figure 1:
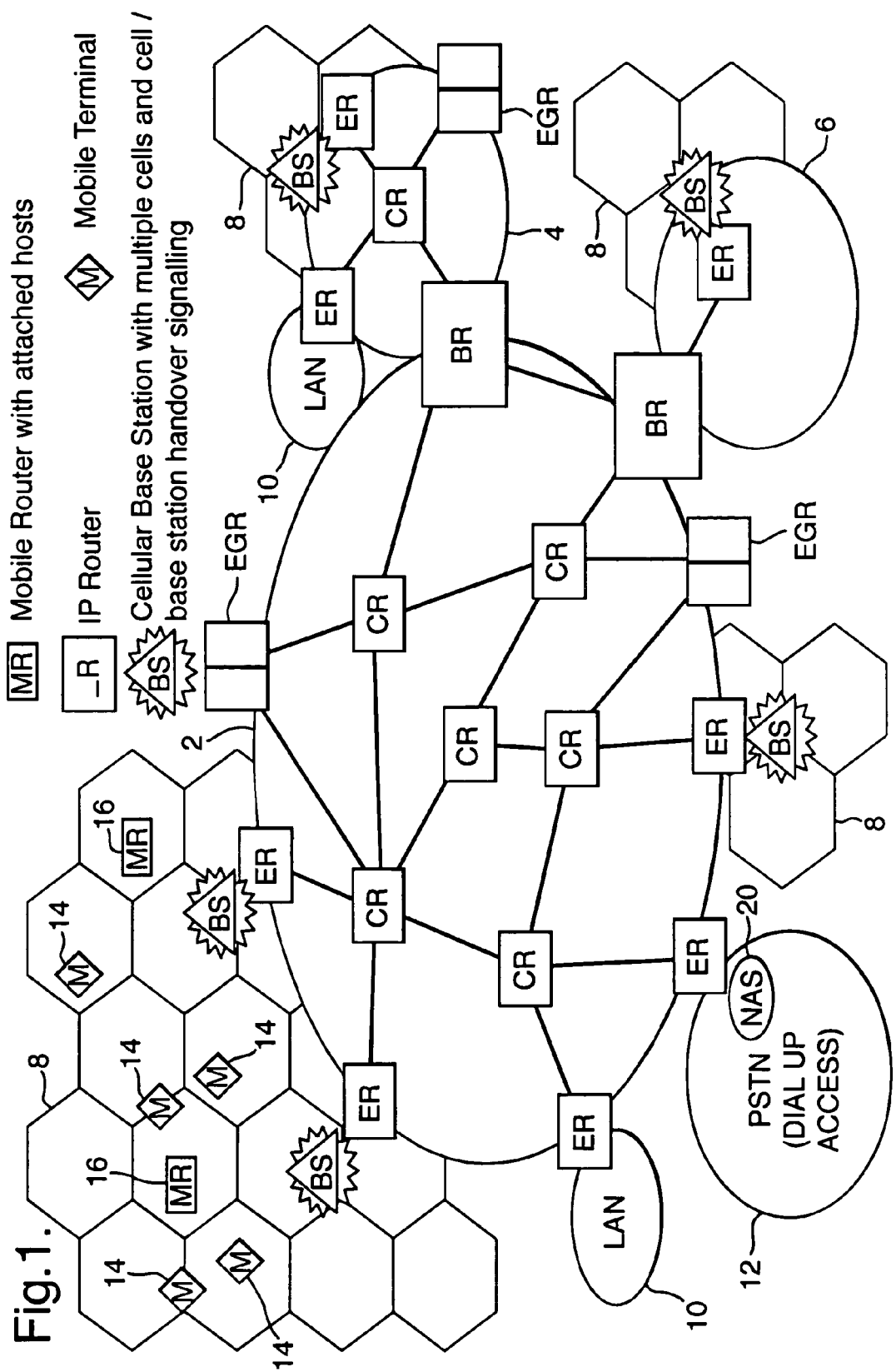
FIG. 1 schematically illustrates an example of a fixed/mobile topology in accordance with an embodiment of the present invention.

Referring now to FIG. 1, an example of a fixed/mobile topology in accordance with an embodiment of the present invention is shown. The topology includes, by way of example, three packet switching networks 2, 4, 6 forming an Autonomous System (AS), the extent of which is schematically indicated by dark shading in FIG. 1. One definition given for the term Autonomous System, is "a set of routers and networks under the same administration" ("Routing in the Internet", Christian Huitema, Prentice-Hall, 1995, page 158). Herein, the term Autonomous System, also referred to as a routing domain in the art, is also intended to mean a network, or a set of networks, having routers running the same routing protocol. An Autonomous System may be connected to other Autonomous Systems forming a global internetwork such as the Internet (used by way of example hereinafter). The routing protocol is an interior gateway protocol, and communications with other Autonomous Systems are achieved via exterior gateway protocols such as the Border Gateway Protocol (BGP). Examples of known interior gateway protocols are the Routing Information Protocol (RIP) and Open Shortest Path First (OSPF).

The networks 2, 4, 6 forming a fixed infrastructure of the Autonomous System include a plurality of Internet Protocol (IP) packet switching nodes in the form of a plurality of Core Routers (CR), a plurality of Edge Routers (ER) and Bridge Routers (BR) interconnecting the different networks 2, 4, 6 in the AS. All of these packet switching nodes run a single IP routing protocol, one embodiment of which is to be described in further detail below.

One or more Exterior Gateway Routers (EGRs) connect the Autonomous System to further Autonomous Systems of the global Internet.

The Autonomous System illustrated in FIG. 1 performs routing for both mobile hosts, for which routing within the AS is altered as a result of mobility of the mobile, and fixed, hosts, that is to say stationary, hosts, for which no such routing alterations occur.

Mobile nodes may be connected to an Edge Router via a wireless link, in the example shown, a cellular radio link (a further possible type of wireless link is an infra-red link) using a Base Station (BS) Router provided by a mobile network operator. The cellular radio link may be a Time Division Multiplier Access (TDMA) system link, such as "GSM", or a Code Division Multiple Access (CDMA) system link, such as "CDMA 2000". Mobile nodes take the form of individual mobile hosts 14, and/or mobile routers 16 having a plurality of hosts attached thereto, which respectively conduct radio communication with one or more (e.g. in the case of a CDMA "soft handover") of the BS Routers at any given time. A BS Router may control a number of Base Transceiver Stations (BTSs) which are co-located with radio antennae around which individual "cells" of the cellular system are formed The mobile nodes 14, 16 move between cells of the cellular radio communications network. If a BS Router serves a number of cells, a mobile node handed over between cells may continue to receive packet data via the same BS Router. However, once a mobile node moves outside the range of a BS Router via which it is receiving service, handing over to a new cell may necessitate a change of routing within the AS. Data packets originating from and destined to the mobile node in question, which are routed, using the identifier of the, or an, IP address of the node, via a given BS Router prior to handover, may require routing, for the same IP address, via a different BS Router following handover. A mobile node may be participating in a communications session with a different host via the AS during handover from one BS Router to another. Because connections at the transport layer (in, for example, a TCP/IP connection) are defined in part by the IP address of the mobile node, such a change in routing is desired to allow such connections to continue using the same IP address when a mobile node receives service from a different BS Router.

Fixed hosts may be connected to an Edge Router via a Local Area Network (LAN) 10, running a local area network protocol such as an Ethernet protocol. Fixed hosts may also be connected to an Edge Router via a Public Services Telephone Network (PSTN) 12 using a Network Access Server (NAS) 20 provided by an Internet access provider. The NAS 20 dynamically allocates fixed IP addresses on a dial-up basis to fixed hosts connecting to the NAS 20 using a protocol such as PPP or SLIP, and routes IP packets originating from, or destined to, each fixed host via an associated Edge Router. Whilst the NAS 20 allocates IP addresses on a dynamic basis, the Edge Router via which packets are routed for the IP address allocated does not change, either during an access session or over a longer-term period. Thus, routing within the Autonomous System does not need to change for each of the fixed hosts other than due to factors internal to the AS such as link failure or traffic management.

The interior gateway protocol, the single IP routing protocol used in the AS in this embodiment of the present invention is a modified version of the Temporally-Ordered Routing Algorithm (TORA) routing protocol, which is described in, inter alia, "A Highly Adaptive Distributed Routing Algorithm for Mobile Wireless Networks" Vincent D Park and M Scott Corson, Proceedings of INFOCOM '97, April 7-11, Kobe, Japan; and "A Performance Comparison of the Temporally-Ordered Routing Algorithm and Ideal Link-State Routing" Vincent D Park and M Scott Corson, Proceedings of ISCC '98, 30 Jun.-2 Jul., 1999, Athens, Greece.

The TORA routing protocol algorithm executes distributedly, provides loop-free routes, provides multiple routing (to alleviate congestion), establishes routes quickly (so they may be used before the topology changes), and minimises communication overhead by localising algorithmic reaction to topological changes when possible (to conserve available bandwidth and increase scalability).

The algorithm is distributed in that nodes need only maintain information about adjacent nodes (i.e. one hop knowledge). It ensures all routes are loop-free, and typically provides multipath routing for any source/destination pair which requires a route. Since multiple routes are typically established, many topological changes do not require routing updates within the AS as having a single route is sufficient. Following topological changes which do require reaction, the protocol reestablishes valid routes.

The TORA protocol models a network as a graph G=(N, L), where N is a finite set of nodes and L is a set of initially undirected links. Each node i∈N has a unique node identifier (ID), and each link (i, j)∈L allows two-way communication (i.e. nodes connected by a link can communicate with each other in either direction). Each initially undirected link (i, j)∈L may subsequently be assigned one of three states; (1) undirected, (2) directed from node i to node j, or (3) directed from node j to node i. If a link (i, j)∈L is directed from node i to node j, node i is said to be "upstream" from node j while node j is said to be "downstream" from node i. For each node i, the "neighbours" of i, $N_i \in N$, are defined to be the set of nodes j such that (i, j)∈L. Each node i is always aware of its neighbours in the set $N_i$.

A logically separate version of the protocol is run for each destination (identical by e.g. a host IP address) to which routing is required.

The TORA protocol can be separated into three basic functions: creating routes, maintaining routes, and erasing routes. Creating a route from a given node to the destination requires establishment of a sequence of directed links leading from the node to the destination. Creating routes essentially corresponds to assigning directions to links in an undirected network or portion of the network. The method used to accomplish this is a query/reply process which builds a directed acyclic graph (DAG) rooted at the destination (i.e. the destination is the only node with no downstream links). Such a DAG may be referred to as a "destination-oriented" DAG. Maintaining routes involves reacting to topological changes in the network in a manner such that routes to the destination are re-established within a finite time. Upon detection of a network partition, all links (in the portion of the network which has become partitioned from the destination) are marked undirected to erase invalid routes.

The protocol accomplishes these three functions through the use of three distinct control packets: query (QRY), update (UPD), and clear (CLR). QRY packets are used for creating routes, UPD packets are used for both creating and maintaining routes, and CLR packets are used for erasing routes.

At any given time, an ordered quintuple, referred to as a "height", $H_i = (\tau_i, oid_i, r_i, \delta_i, i)$ is associated with each node i∈N. Conceptually, the quintuple associated with each node represents the height of the node as defined by two parameters: a reference level and a delta with respect to the reference level. The reference level is represented by the first three values in the quintuple while the delta is represented by the last two values. A new reference level is defined each time a node loses its last downstream link due to a link failure. The first value representing the reference level, $\tau_i$, is a time tag set to the "time" of the link failure. The second value, $oid_i$, is the originator-ID (i.e. the unique ID of the node which defined the new reference level). This ensures that the reference levels can be totally ordered lexicographically. The third value, $r_i$, is a single bit used to divide each of the unique reference levels into two unique sub-levels. This bit is used to distinguish between the original reference level and its corresponding, higher reflected reference level. The first value representing the delta, $\delta_i$, is an integer used to order nodes with respect to a common reference level. This value is instrumental in the propagation of a reference level. Finally, the second value representing the delta i, is the unique ID of the node itself. This ensures that nodes with a common reference level and equal values of $\delta_i$, (and in fact all nodes) can be totally ordered lexicographically at all times.

Each node i (other than the destination) maintains its height, $H_i$. Initially the height of each node in the network (other than the destination) is set to NULL, $H_i = (-, -, -, -, i)$. Subsequently, the height of each node i can be modified in accordance with the rules of the protocol. In addition to its own height, each node i maintains, in a routing protocol data table, entries against host IP addresses having an existing DAG in the network, the entries including a height array with an entry $HN_{ij}$, for each neighbour j∈$N_i$.

Each node i (other than the destination) also maintains, in the routing protocol data table, a link-state array with an entry $LS_{ij}$ for each link (i, j)∈L. The state of the links is determined by the heights $H_i$ and $HN_{ij}$ and is directed from the higher node to the lower node. If a neighbour j is higher than node i, the link is marked upstream. If a neighbour j is lower than node i, the link is marked downstream.

The TORA protocol was originally designed for use in a Mobile Ad-Hoc Network (MANET) in which the routers are mobile and are interlinked via wireless links. However, in this embodiment of the invention a modified TORA protocol is used in an Autonomous System including a fixed infrastructure of fixed routers interconnected by fixed links, such as that illustrated in FIG. 1, to provide for routing alterations in the fixed infrastructure when a mobile host alters its point of attachment to the infrastructure.

FIG. 26 illustrates schematically an example of a routing protocol data table which may be held in a router in accordance with this embodiment.

Against each host IP address (or address prefix in the case of an aggregated DAG, to be described in further detail below) IP1, IP2, etc having a DAG in the network is stored the height of the storing node $H_i$(IP1), $H_i$(IP2), etc. Also, the identity of each adjacent neighbour for example w, x, y, z and that neighbour's height $HN_{iw}$(IP1, IP2, etc), $HN_{ix}$(IP1, IP2, etc), $HN_{iy}$(IP1, IP2, etc) and $HN_{iz}$(IP1, IP2, etc). Finally, the link-state array for each IP address (or prefix) may be stored in the form of markings signifying an upstream link (U), a downstream link (D), or an undirected link (−) against each link identity (L1, L2, L3, L4) corresponding to each neighbour.

The link-state array held in the routing protocol data table allows a next-hop forwarding decision to be made locally in the router holding the data. For a sufficiently interconnected network, each router should have at least one downstream link. If only one downstream link exists, that link is selected as the next-hop forwarding link. If more than one downstream link exists, an optimum downstream link may be selected, for example on the basis of current traffic loading on the two links. In any case, the selected link is entered into a next-hop forwarding data table against the IP address. A next-hop forwarding table, such as that illustrated in FIG. 27, is held in cache memory for fast access as IP packets requiring routing arrive at the router. The table stores the next-hop forwarding link (L2, L1, etc) selected, against each IP address (or prefix) IP1, IP2, etc.

The use of a fixed infrastructure of routers, and other aspects of the invention to be described below, allow for routing aggregation within the AS, in particular for the IP addresses of mobile hosts. What follows is a brief description of IP addressing, in particular how variable length prefixes are used to provide routing aggregation in an IP routing network.

IP addresses currently consist of a predetermined number (32) of bits. IP addresses were in the past allocated on an unstructured basis (referred to as a "flat" addressing plan). Classful addressing introduced the concept of a two level routing hierarchy by splitting addresses into network prefix and host fields. Users were allocated IP addresses as either a class A, class B or class C to simplify routing and administration.

In class A, bit 0 identifies class A, bits 1-7 identify network (126 networks) and bits 8-31 identify host (16 million hosts).

In class B, bits 0-1 identify class B, bits 2-15 identify network (16,382 networks) and bits 16-31 identify host (64,000 hosts).

In class C bits 0-2 identify class C, bits 3-23 identify network (2,097,152 networks) and bits 24-31 identify host (256 hosts).

A two-level hierarchy still left a flat routing hierarchy between hosts within a network. For example, a class A address block could have 16 million hosts which would result in all routers within the network containing 16 million routing table entries. Subnetting was developed to allow a host address block to be split into a variable length subnet field and host field. This allows routers within an AS to keep routing table entries for subnets only (providing the aggregation of routing for all the hosts on each subnet). A subnet mask is used to enable routers to identify the subnet part of the address.

In accordance with this embodiment of the invention, routing aggregation is provided by assigning a host IP address block (i.e. a contiguous sequence of IP addresses sharing one or more prefixes) to an access node such as a BS Router, and dynamically allocating IP addresses from within the block to mobile hosts for the duration of their access sessions. When a mobile host registers with the cellular network on power up, the serving BS Router allocates an IP address and caches a binding between the mobile host's wireless link identifier and the allocated IP address. An aggregated routing plan, in this embodiment an aggregated DAG is pre-computed within the AS before the mobile host is allocated the IP address it is to use throughout its access session. Following power down of the mobile host, the IP address is returned to the owning BS Router, which may then allocate the IP address to another mobile host. Mobile host IP addresses allocated by a BS Router will have an aggregated DAG, until at least one of the mobile hosts moves away, in which case the aggregated DAG will remain in place, but a host-specific exception will be created on the routers affected by a mobility-specific routing updating procedure (the update only changes routing for the single mobile which has moved away).

Pre-computation of routes in an AS for address prefixes owned by a BS Router is achieved by the owning BS Router injecting an update message, referred to herein as an "optimization" (OPT) packet, for each prefix which floods out across the AS and effectively acts as a prefix announcement as well as building the aggregated DAG. The OPT packet is transmitted by the BS Router owning the IP address prefix, or prefixes, and controlling the aggregated DAG. The OPT packet propagates to all other nodes in the network (regardless of their current heights (if set)), and (re)sets these heights to the "all-zero" reference level, that is to say the first three values ($\tau_i$, $oid_i$, $r_i$) of the TORA heights are all set to zero. The fourth height value, $\delta_i$, is set to the number of hops taken by the OPT packet since transmission from the BS Router (this is similar to UPD packet propagation in known TORA source-initiated DAG creation mechanisms). An increment of 1 may be added to represent the hop from the BS Router to the mobile node. The fifth height value, i, is set to the node ID.

Once an aggregated DAG exists in the AS, each packet switching node in the AS has a next-hop forwarding table entry for the IP address prefix in question. When a packet arrives at a node which requires routing, the node searches its next-hop forwarding table for the longest matching address entry on which to base the next routing decision, which, providing the mobile node using the IP address has not moved away from the owning BS Router, will be the IP address prefix. By providing for aggregated DAGs within the AS, routing table size and routing processing may be minimised at each packet switching node.

However, when a mobile node is handed over at the wireless link layer away from the BS Router at which it first received service in the network, an individual host address entry is created in both the routing protocol data table and the next-hop forwarding table in (a limited number of) packet switching nodes affected by routing updates caused by the mobility of the mobile node. Theses nodes continue to store the corresponding aggregated address entries, but use the host address entry for routing packets to the IP address of the mobile node by virtue of the longest match search.

The TORA height maintenance algorithm falls into the same general class of algorithms originally defined in "Distributed Algorithms for Generating Loop-Free Routes in Networks with Frequently Changing Topology", E Gafni and D Bertsekas, IEEE Trans. Commun., January 1991. Within this class, a node may only "increase" its height; it may never decrease its height. However, in this embodiment of the invention, an algorithmic modification is provided to ensure that, after an inter-BS Router handover, a node's forwarding behaviour is such that, when a plurality of routing interfaces to neighbouring nodes exist, it forwards packets over a routing interface to a neighbouring node from which a mobility-related routing update was most recently received. The $\tau$ time value in the height quintuple ($\tau_i$, $oid_i$, $r_i$, $\delta_i$, i) stored in the router's routing protocol data table as an entry against the mobile node's IP address and the neighbour in question is permitted to become "negative", i.e.

less than zero, to indicate a mobility-related update having occurred, and the magnitude of the negative τ time value increases for each occurrence of a mobility-related routing update for a given IP address. Thus, the most recent mobility-related update is indicated by the greater negative τ time value. It is to be noted, that whilst mobility-related routing updates are distinguished by a negative τ time value, other indicators may also be used, such as a one-bit flag, to replace the negative flag.

When a mobile node changes BS Router affiliation, it decreases its height value by decreasing the τ time value, for example by an integer, and the new value is propagated to a limited number of nodes in the AS as part of a mobile-initiated update of the DAG associated with the mobile node's IP address, to be described in further detail below. A node having multiple downstream neighbours routes onto the most recently-activated downstream link. The heights are still totally-ordered (hence routing loop freedom is preserved).

A further aspect of this embodiment of the invention is that, during a handover of a mobile node at the wireless link layer, a temporary, short term, tunneling mechanism is provided whereby data packets arriving at the BS Router from which the mobile node is being handed over may be forwarded to the BS Router to which the mobile node is being handed over. Tunneling in an IP packet switching network may be achieved by encapsulation of the data packet with a new IP header (addressed to the IP address of the new BS Router), referred to as "IP-in-IP tunneling". At the new BS Router, the packet is decapsulated and forwarded to the mobile node via the wireless link. Tunnel setup, signalling and authentication mechanisms may be those used in "Mobile IP", as described in, inter alia, "IP Mobility Support", C Perkins, ed., 1ETF RFC 2002, October 1996. With all BS Routers enabled with "Mobile IP", "Mobile IP" may also be used to allow packet forwarding to mobile nodes moving to a different AS. Other possible tunneling protocols include UDP tunneling (in which a UDP header is added to incoming packets), GRE tunneling (a CISCO (TM) protocol), the Layer 2 Tunneling Protocol (L2TP), and negotiated or configured IPSEC tunnel modes.

When a mobile node is to be handed over from a BS Router, that BS Router interacts with the new BS Router, to which the mobile node is being handed over to, to undertake the following steps:

(a) to prepare a unidirectional tunnel to the new BS Router, so that packets may be forwarded to the mobile node after the wireless link between the old BS Router and the mobile node is lost. The tunnel may be prepared by a mapping to a pre-existing inter-BS Router tunnel, or a host-specific tunnel, dynamically negotiated via Mobile IP mechanisms.

(b) to handover the mobile node at the wireless link layer.

(c) to inject a routing update for the mobile node's IP address (or addresses, in the case of a mobile router) from the new BS Router.

(d) to forward data packets destined to the mobile node's IP address and arriving at the old BS Router though a tunnel link to the new BS Router.

(e) to update the invalid routing to the old BS Router.

(f) to tear down the tunnel, if host specific, or to remove the host-specific state in a pre-existing tunnel, following the convergence of routing.

Prior to handover, all packets are routed directly to the mobile node via a route, or routes, in the infrastructure passing through the old BS Router. Following the convergence of routing, all packets are routed directly to the mobile node via a route, or routes, in the infrastructure passing through the new BS Router.

When handover is signalled to the new BS Router (either from the old BS Router as part of tunnel establishment, or from the mobile node via a mobile-assisted handover), the new BS Router generates a directed routing update message which is unicast to the old BS Router using the existing DAG for the mobile node's IP address (which remains directed to the old BS Router). This update selectively modifies the mobile's DAG along the reverse lowest-neighbour path (an approximate shortest path) to the old BS Router. At the end of this update, the old BS Router will have a new downstream link in the DAG for the mobile node's IP address after the mobile node is handed over at the radio link layer. A crossover router will, during the update process, receive the unicast-directed update at which point an existing data flow is redirected to the mobile node's new BS Router.

This update procedure is not topologically dependent, and is employed regardless of the topological distance between the new and old BS Routers (which can vary substantially depending on the BS Routers' relative positions).

The short term tunnel avoids packet loss in the case routing to the new BS Router is not established by the time the wireless link to the old BS Router is lost, and if no significant amount of caching is performed at the old BS Router.

The use of a short-term tunnel may nevertheless not always be necessary, depending on the relative ordering of the two events:

(i) loss of the BS Router-to-mobile node wireless link at the old BS Router and (ii) arrival of the directed routing update at the old BS Router.

If the routing update arrives before the old wireless link is lost, there is no need for the tunnel as no further data packets will arrive at the old BS Router due to the rerouting (providing control and data packets have equal queuing priority and treatment; if not, then data packets already queued may still arrive after the routing update) and all past data packets will have been forwarded to the mobile over the old wireless link. If no tunnel is required, the premature triggering of a TORA update at the old BS Router, due to a loss of all downstream links when the old wireless link is lost, may be prevented by marking a virtual downstream link at the old BS Router until routing converges. Thus, routing hold-down at the old BS Router may be achieved purely by signalling.

Routing hold-down purely by signalling may also be used where the old BS Router functions as a cache, for example a transparent cache, allowing the old BS Router to store relatively large volumes of data until routing converges, and retransmitting the data once routing converges.

As mentioned above, when a mobile node ends its access session, the routing for the mobile node's IP address may be returned to the BS Router from which it originated, i.e. the IP address's home BS Router. A mechanism is provided to efficiently restore the destination of the DAG to the home BS Router, which requires the participation of only a limited number of nodes in the AS.

When a mobile node ends its access session, the current BS Router contacts the IP address's home BS Router and initiates the transfer of the destination of the DAG to the home BS Router. Again, a tunnel link can be used as a hold-down mechanism to suppress the initiation of a routing update at the current BS Router or, more simply, a virtual link (a non-functioning downstream link marking at the current BS Router) may be used if no data is to be forwarded. The current BS Router establishes a tunnel link or a virtual downstream link directed to the home BS Router. In response, the home BS Router generates a directed "restore" update which is sent towards the current BS Router using the existing DAG for the mobile node's IP address (which remains directed to the current BS Router). This update deletes all the host-specific routing protocol data table entries and next-hop forwarding table entries created by the previous mobility of the mobile node, to restore the pre-computed aggregated DAG as the active routing plan for the mobile node's IP address. The update travels over the path previously created by routing updates caused by the mobile node's past mobility. Thus, the set of negative height values that the mobility-specific updates generated are erased, and the aggregated DAG with its "all-zero" reference level (assuming there have been no failures in the network causing new height generations and reversals) is reactivated. The tunnel link or the virtual link can be maintained until reception of the restore update at the current BS Router, at which time either the tunnel is torn down or the virtual link is removed.

Periodically, or on detection of a triggering event, the mobile node, or a BS Router acting on behalf of the mobile node, may re-initialise the DAG for an IP Address, using a TORA update mechanism, with "all-zero" reference levels thereby removing any mobility-related routing table entries for the DAG. "All-zero" reference levels propagated in this manner take precedence over all other height values (both positive and negative) and may propagate throughout the AS (an AS-wide DAG re-optimisation). This provides a mechanism for soft-state route maintenance, which overrides the mobility-related updating mechanism.

A detailed example of inter-BS handover at the wireless link layer and routing updates within the fixed infrastructure of an AS will now be described with reference to FIGS. 2 to 11. A further example is described with reference to FIGS. 12 to 16. Finally, a detailed example of the restoration of routing to a home BS after the end of a mobile host access session is described in relation to FIGS. 17 to 25. In each of the TORA height quintuples illustrated in FIGS. 2 to 25, the node ID is depicted using the reference i, for simplicity. However, it will be appreciated that this value will be different for each node, so as to uniquely identify the node within the AS. It will also be noted that only a part of the AS is illustrated, for the sake of simplicity.

In all of the following examples, the AS includes a plurality of fixed core routers (CR1, CR2 . . . ), a plurality of fixed intermediate routers (IR1, IR2 . . . ) and a plurality of fixed edge routers (ER1, ER2 . . . ), classified in accordance with their relative proximity to the topological "edge" of the fixed infrastructure. The core routers may be adapted to handle higher quantities of traffic than the intermediate routers, and the intermediate routers, in turn, may be adapted to handle higher quantities of traffic than the edge routers. For example, the core routers may handle national traffic, the intermediate routers regional traffic, and the edge routers sub-regional traffic.

Packet switching routers are co-located and functionally combined with wireless base stations and the combined entity will be referred to herein as an access node (BS1, BS2 . . . ), although it should be appreciated that the term "access node" is not intended to be restricted to a routing node including wireless BS functionality. For example, an "access node" may be provided at a node which is topologically distant from a BS.

In the case of all of the examples described below, the hop-by-hop routing directionality at the interfaces is indicated by arrows marked along links between nodes of the network, and between access nodes and mobile nodes (which links include a wireless link). The distributed routing plan is in the form of a TORA DAG directed at a single receiving mobile host, MH2. Before the mobile host MH2 begins an access session, and is dynamically allocated an IP address, a pre-computed and aggregated DAG exists for the IP address within the AS, having been injected as an AS-wide update from the access node allocating the IP address, node BS2. In FIGS. 2 to 25, nodes involved in routing updates or packet forwarding are marked with their TORA height quintuple ($\tau_i$, $oid_i$, $r_i$, $\delta_i$, i). As previously described, this TORA height is also stored within the routing protocol data table of each neighbouring node, having been advertised from the node to which the height applies.

When the mobile node MH2 registers with the home access node BS2, the home access node caches the identity of the mobile host at the wireless link layer against the IP address which is allocated, thus forming a mobile-specific entry in a routing table held in node BS2.

Figure 2:
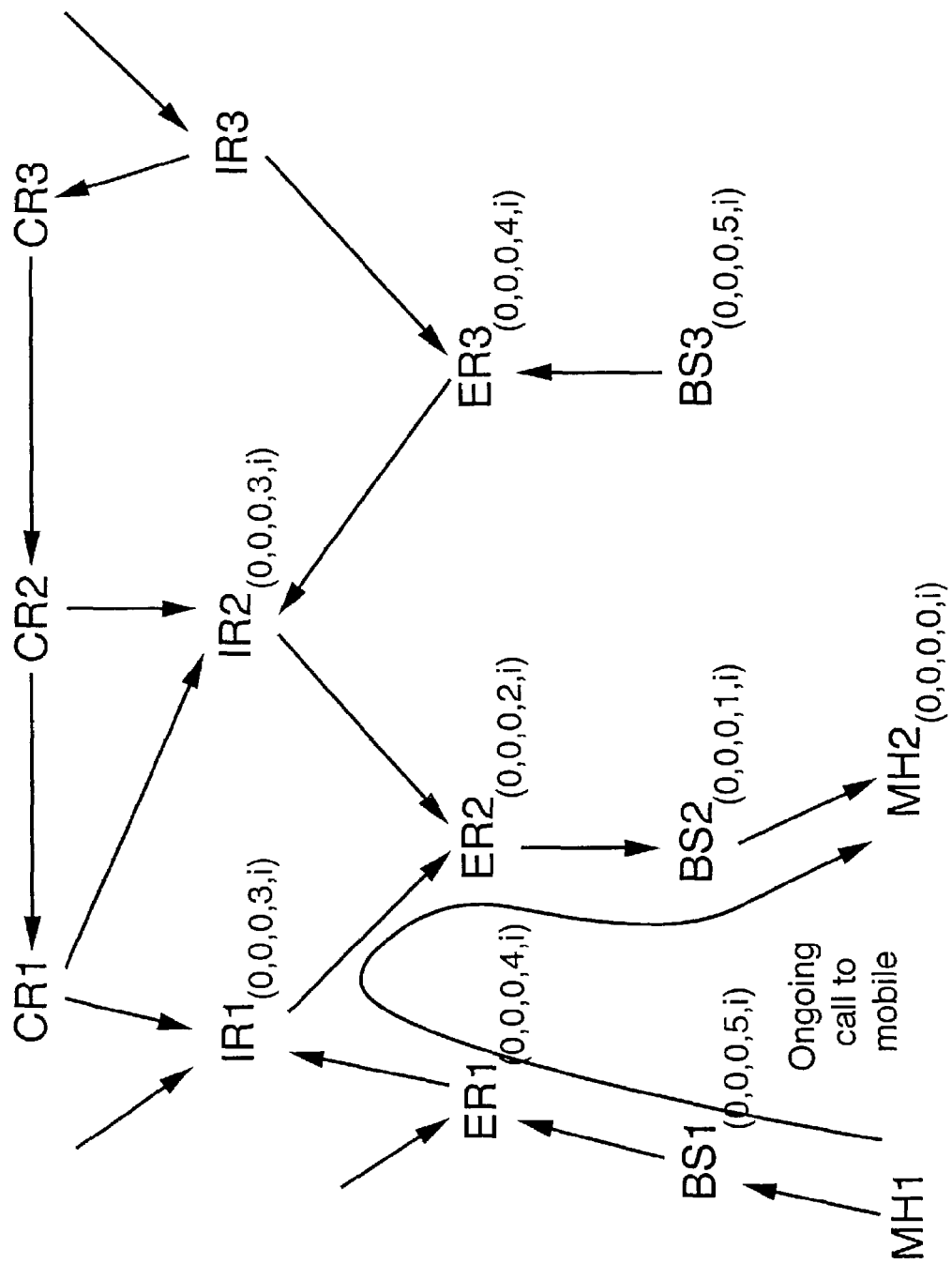
FIGS. 2 to 11 schematically illustrate inter-base station handover and the accompanying routing updates in accordance with an embodiment of the present invention.

FIG. 2 illustrates an exemplary communications session (for example, a TCP/IP connection) occurring between the mobile node MH2 and a further host, in this case a mobile host, MH1. In the following examples, mobility of the correspondent mobile host MH1 does not occur, although such mobility is possible using the same functionality which is to be described in relation to the mobility of the node MH2. A similar communications session may also be conducted with a correspondent fixed host. Notably, a separate DAG exists within the AS directed towards the node MH1, whereby data packets originated from the node MH2 are routed to the node MH1. As this DAG directed to the node MH1 does not alter, and routing exists towards the node MH1 from each access node which the node MH2 affiliates with, no further description of routing towards the node MH1 will be provided.

Data packets originated from the node MH1 and destined to the node MH2 are initially routed to the home access node BS2 via its aggregated DAG, for example via fixed nodes BS1, ER1, IR1, and ER2, as shown in FIG. 2.

Figure 3:
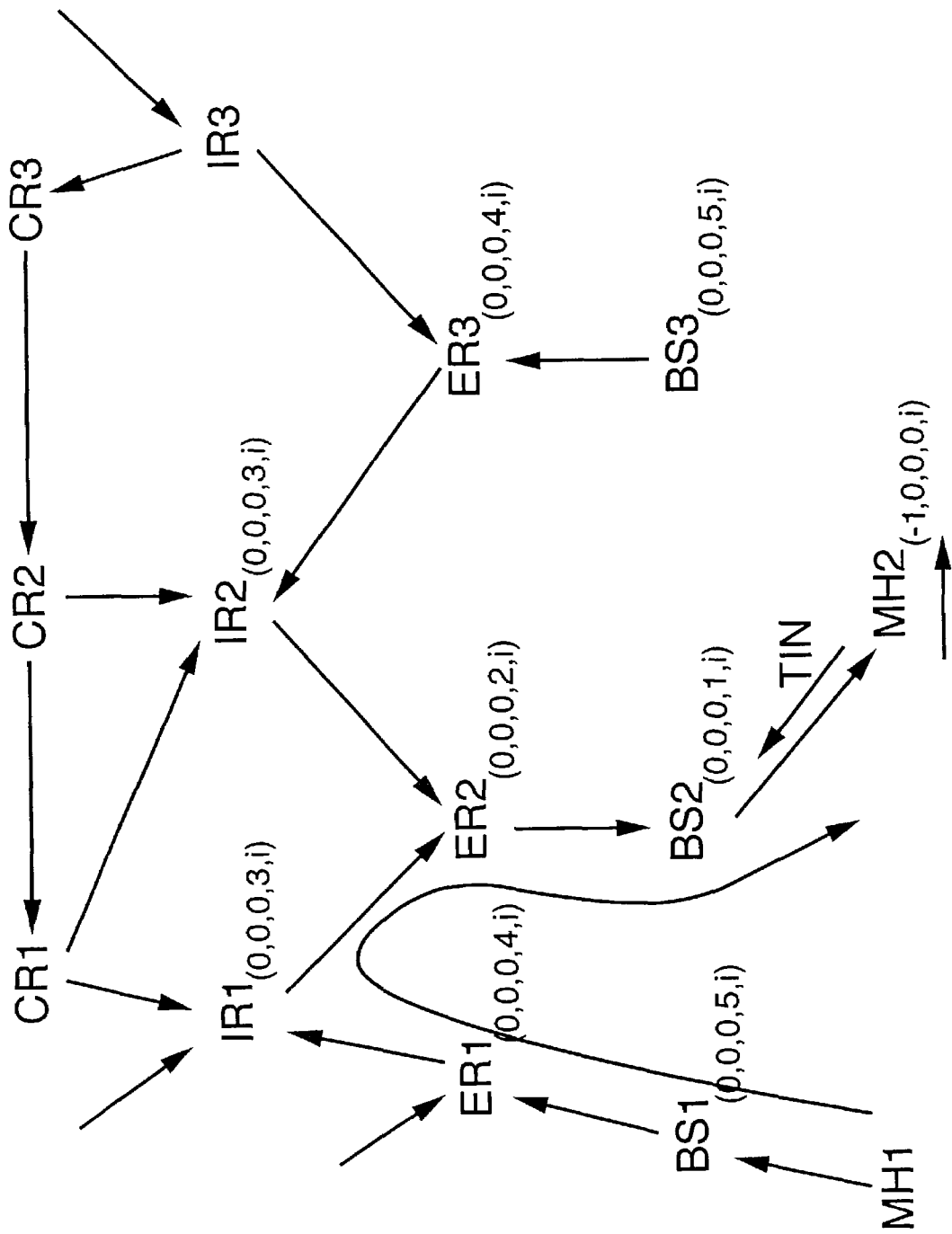

Referring now to FIG. 3, a wireless link layer inter-BS handover decision may be made either by the node MH2 itself, or by the node BS2. In the case of a mobile node-initiated handover, the decision may be made based on a comparison of wireless link quality between signals received from the nodes BS2 and BS3. As the mobile node MH2 moves, the signal received from access node BS3 may improve, whilst the signal received from access node BS2 worsens, and at a threshold decision event, the mobile host responds by initiating a handover between nodes BS2 and BS3. In the case of a handover decision made at node BS2, the decision may be made based on other considerations, such as traffic load. In such a case, the access node BS2 transmits a handover instruction to node MH2.

Whether the inter-BS handover is initiated by the mobile node MH2 or the home access node BS2, the mobile node MH2 selects a new access node BS3 and transmits a tunnel initiation (TIN) packet to the home access node BS2. The TIN packet includes the IP address of the new access node BS3, which the mobile node reads from a beacon channel broadcast by access node BS3. Mobile node MH2 also computes a new height, by decreasing the $\tau$ time value of its height to a negative value, −1 (indicating a first mobility-related routing update away from the home access node BS2), and includes this in the TIN packet.

Figure 4:
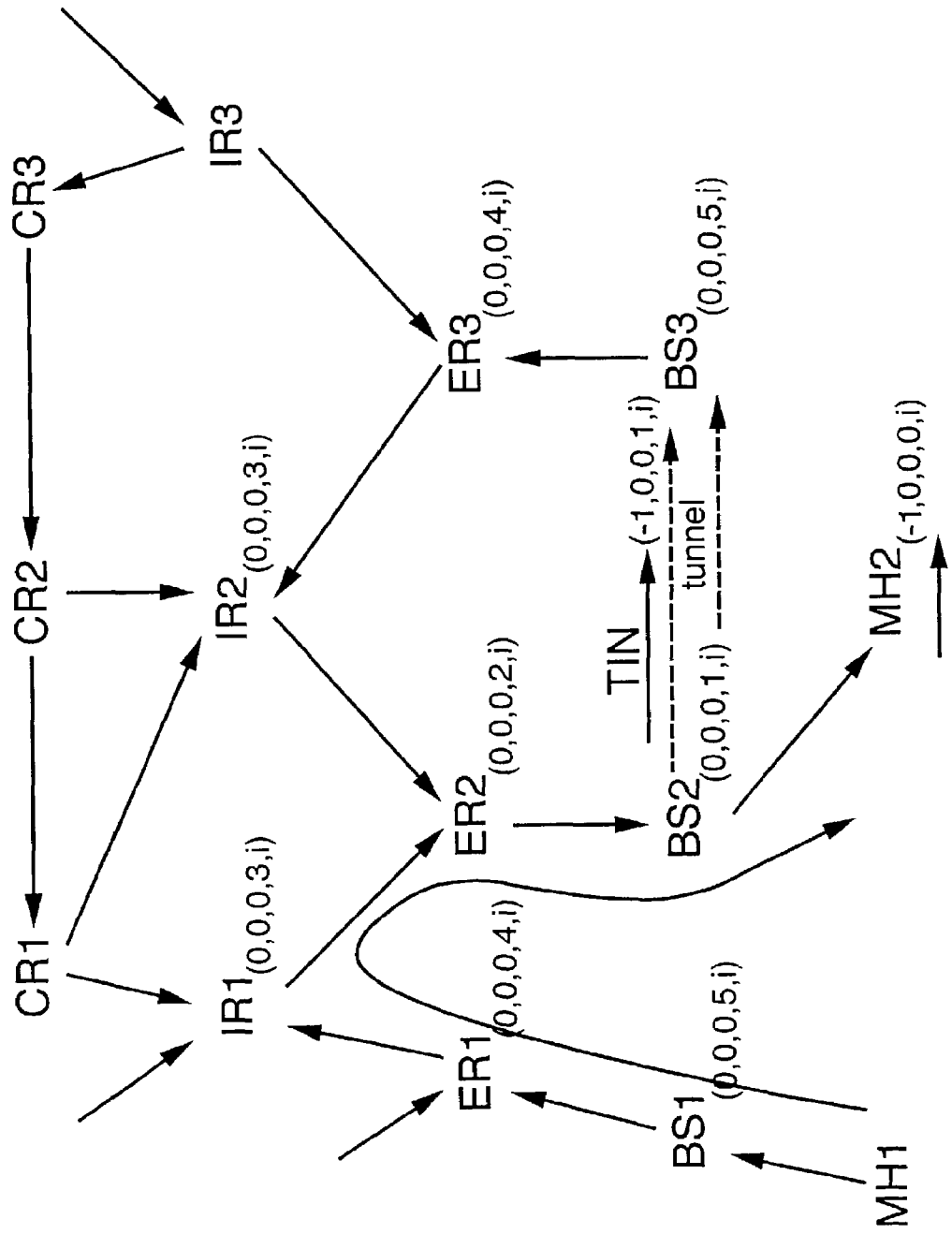
Figure 5:
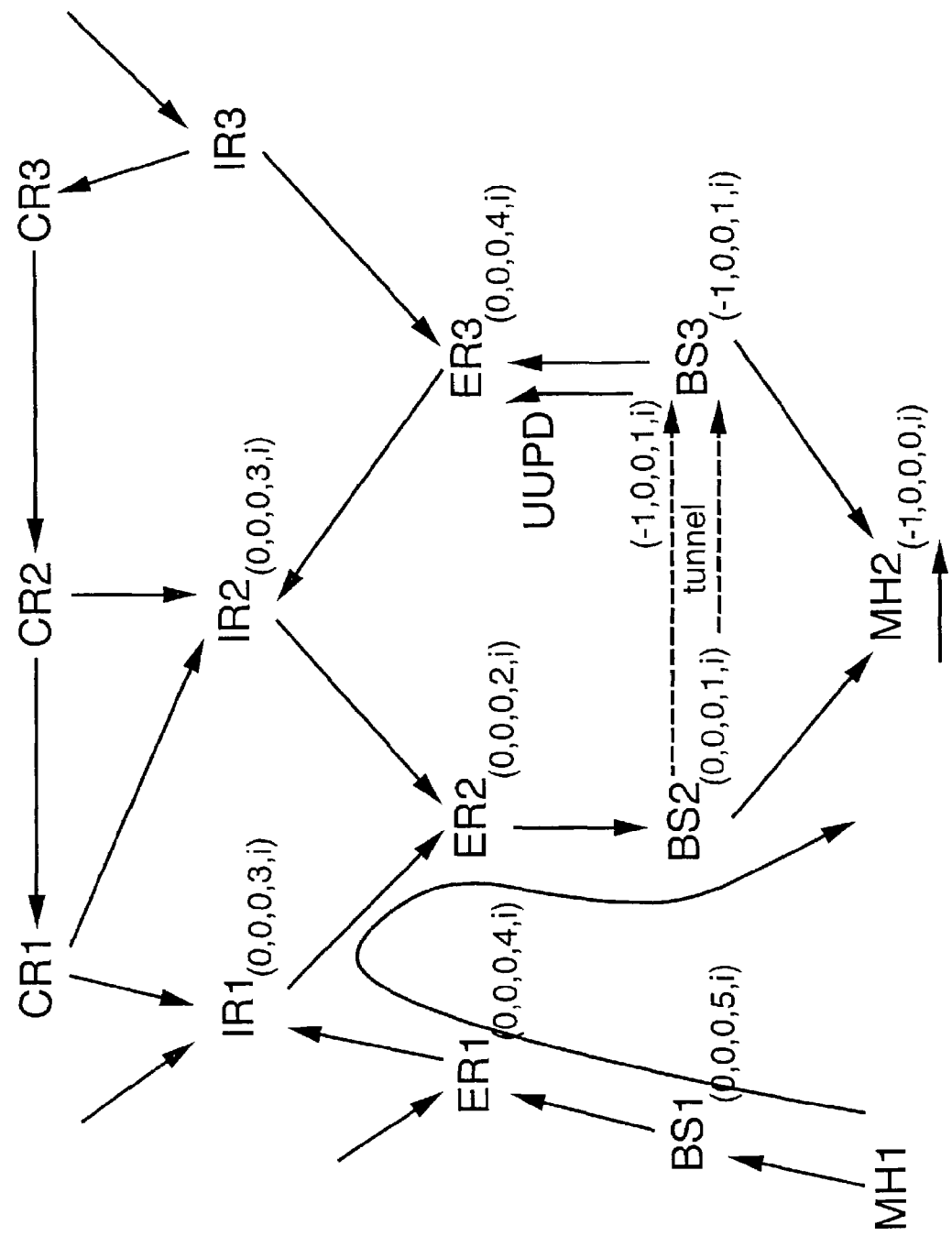

Referring now to FIG. 4, when the home access node BS2 receives the TIN packet from mobile node MH2, the home access node BS2 establishes a short term IP-in-IP tunnel link towards the new access node BS3. The home access node BS2 enters the tunnel interface to BS3 in its routing table, the TORA height of the new access node BS3 being set equal to (−1, 0, 0, 1, i) to ensure the tunnel interface being marked as a downstream link for data packet forwarding during the remainder of the handover procedure.

When the short-term tunnel link has been established from home access node BS2 to new access node BS3, the home access node BS2 forwards the TIN packet received from mobile node MH2 to the new access node BS3 via the tunnel interface.

In the present example, the nature of the wireless link system used is such that the mobile node MH2 is (as in a CDMA cellular radio system allowing soft handover) able to communicate via two wireless links to each access node BS2 and BS3 during a handover. Thus, next, the mobile node MH2 establishes a second wireless link with the new access node BS3, and a routing table entry is made in node BS3 indicating a downstream link towards mobile node MH2.

The new access node BS3 generates a unicast-directed update (UUPD) packet and transmits the packet to its neighbouring node in the fixed infrastructure, node ER3. The UUPD packet is to travel along a unicast path between the new access node BS3 and the home access node BS2, updating entries in the routing protocol data tables, and consequently also in at least some of the next-hop forwarding tables, of all nodes along the update path, and all nodes immediately adjacent to the nodes along that path (the nodes along the path transmit an advertisement of their new heights to each immediately neighbouring node, the propagation of the advertisements being limited to one hop).

Figure 6:
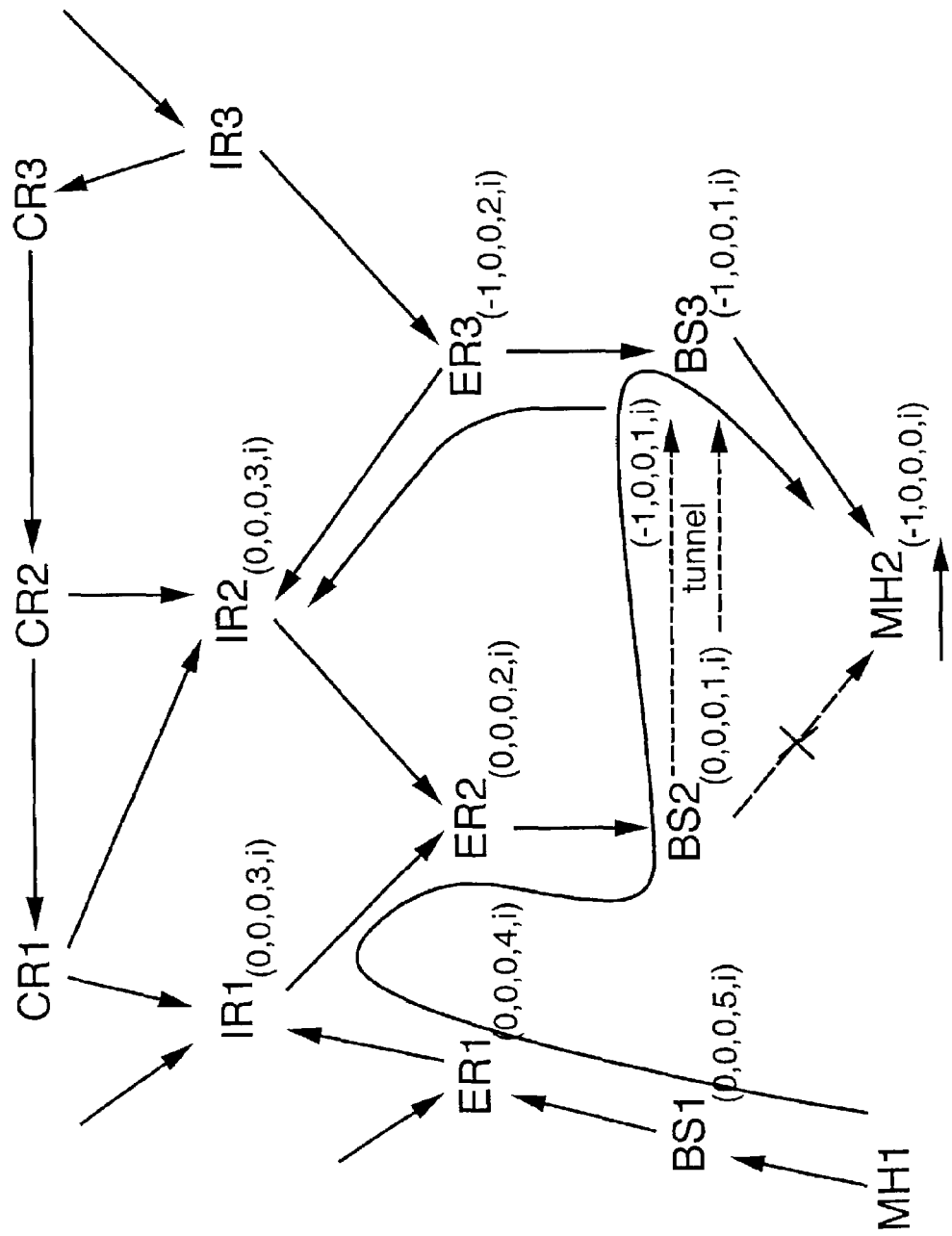

Referring now to FIG. 6, after the mobile host MH2 establishes a new wireless link with the new access node BS3, the old wireless link to the home access node BS2 is pulled down. Data packets directed to the mobile node MH2 arriving at the home access node BS2 are forwarded to the new access node BS3 via the short-term tunnel, and onward to the mobile node MH2 via the new wireless link.

Although the old wireless link is now lost, no routing update is yet triggered at the home access node BS2 (as would otherwise occur according to the TORA protocol), since a remaining downstream link exists along the tunnel which has been established between the home access node BS2 and the new access node BS3. Thus, routing towards the home access node BS2 remains in place until the routing update initiated from the new access node BS3 arrives at the home access node BS2. As shown in FIG. 6, the UUPD packet is forwarded from the first node ER3 receiving the UUPD packet, which also updates its height with the negative τ time value associated with the mobility update (−1), to node IR2. Node IR2, in turn, updates its height with the negative τ time value associated with the mobility-related update.

Each node along the routing update unicast route also increments its δ value in the TORA height quintuple by one for each hop of the routing update UUPD packet, so that the δ value represents the number of hops to the mobile node via the new access node BS3, in place of the δ values of the previous routing table entry which indicated the number of hops to the mobile node via the home access node BS2. Each link in turn along the unicast directed update route is thus directed towards the new access node BS3.

Figure 7:
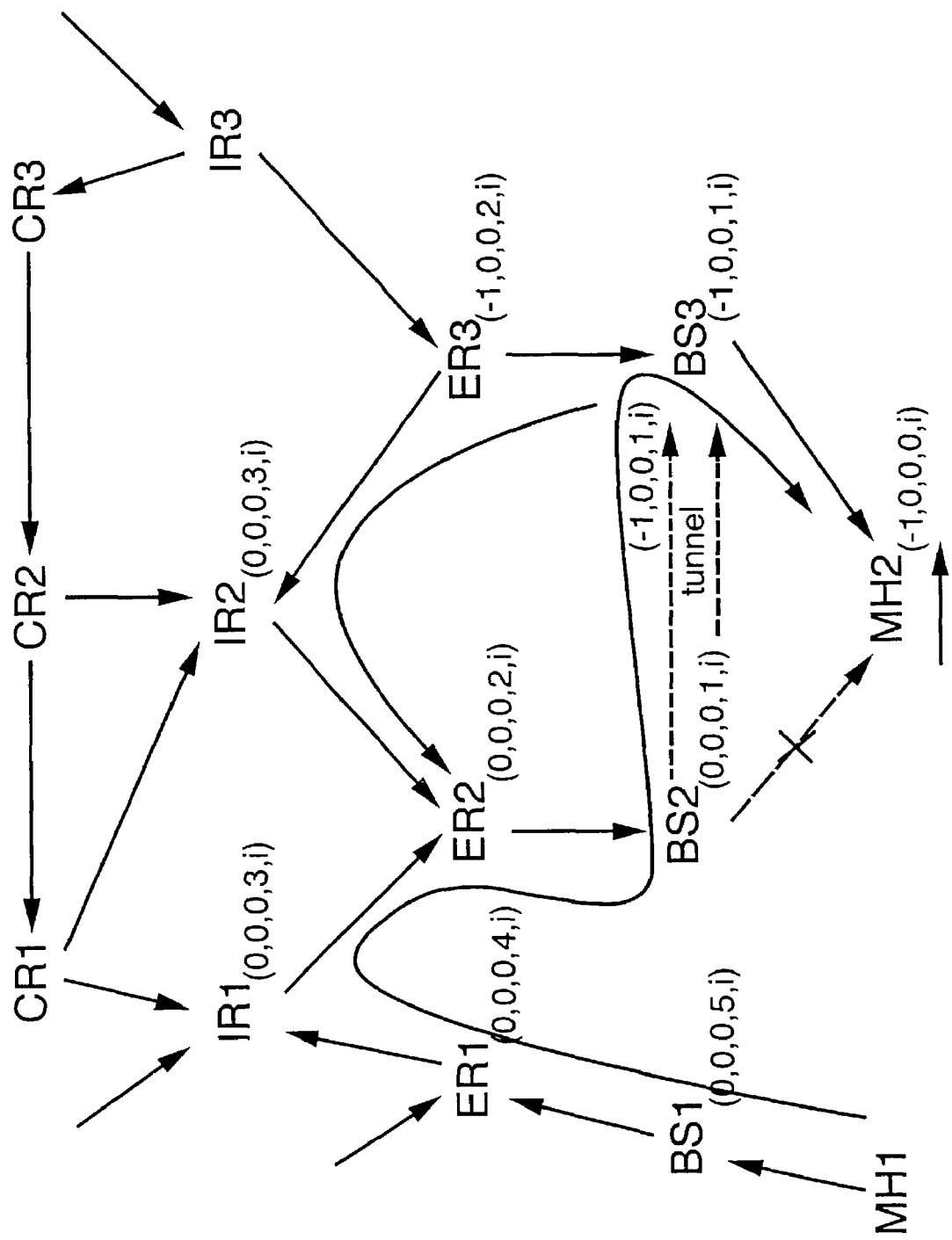
Figure 8:
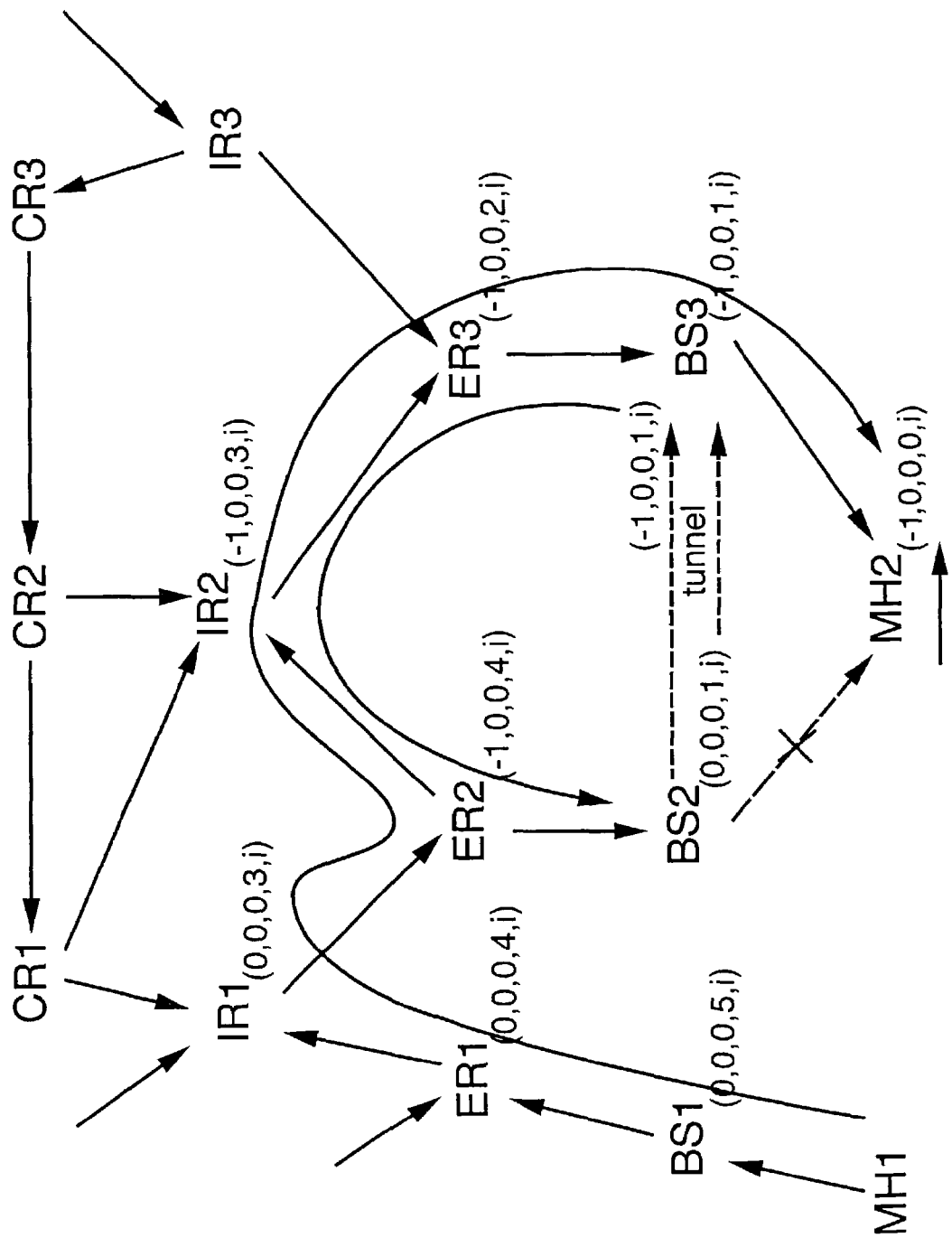

Referring now to FIG. 7, the UUPD packet is next forwarded to the subsequent node along the unicast updating route, node ER2. Node ER2 is a router which marks the cross-over point between the routing path followed from the transmitting node MH1 to the home access node BS2 and the routing path to be followed by packets transmitted from the node MH1 to the new access node BS3 (the routing path being established). As shown in FIG. 8, once the routing protocol data table entries in node ER2 are updated on receipt of the UUPD packets, the cross-over node ER2 has two downstream links, one directed towards the home access node BS2 and one directed towards the new access node BS3. However, because the downstream link directed towards the new access node BS3 includes a negative τ time value, which indicates a (most-recent) mobility-related update, the downstream link directed towards the new access node BS3 is preferentially selected as the next-hop forwarding link. Data packets arriving at node ER2 directed to the mobile host MH2 are forwarded to node IR2, along the routing path to the new access node BS3. Following the diversion of the routing path at the cross-over router ER2, no further data packets are forwarded to BS2 and no further data packets are forwarded through the tunnel interface between the node BS2 and the node BS3. However, the tunnel interface remains in place for the time being at the home access node BS2, in order to ensure that no routing update is generated from home access node BS2 (due to loss of all its downstream links) until the UUPD packet arrives at the home access node BS2. On arrival of the UUPD packet at the home access node BS2, the tunnel state entries in the routing table of BS2 are removed, thereby tearing down the tunnel interface for MH2.

Figure 9:
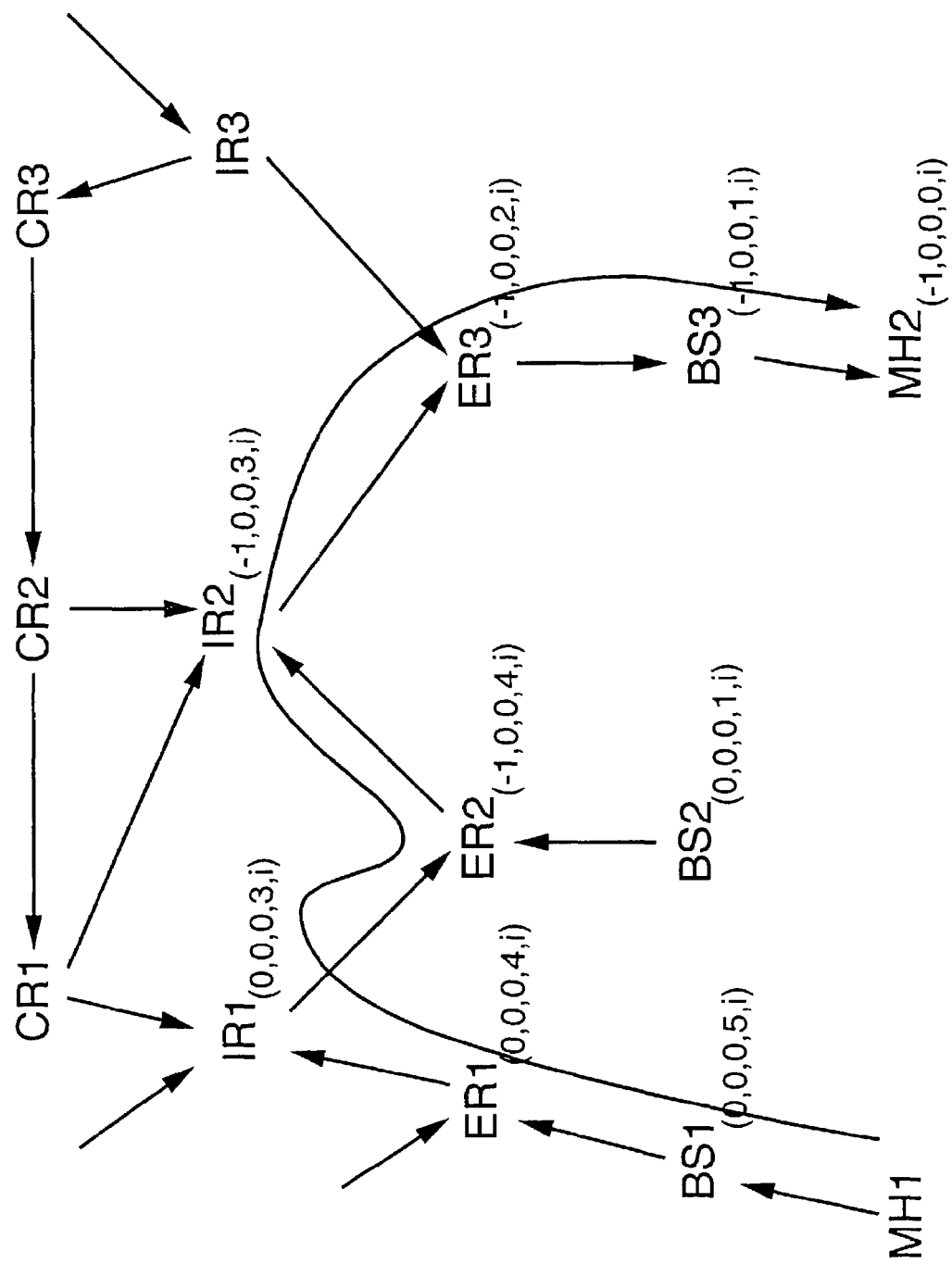

Referring now to FIG. 9, it will be noted that the height of the home access node BS2 is not redefined on receipt of the UUPD packet (however, the link direction between the node BS2 and ER2 is reversed because of the negative τ time value defined in the height for node ER2, thus allowing other mobile hosts receiving service via BS2 to transmit packets to MH2), since the home access node BS2 forms the end of the unicast update path.

Finally, on receipt of the UUPD message, the home access node BS2 may transmit an update-complete acknowledgement (UUPD-Ack) towards the new access node BS3. The UUPD-Ack packet follows the unicast-updated routing path established in the DAG towards new access node BS3. On transmission of the UUPD-Ack packet, old access node BS3 relinquishes tentative control for the DAG for the IP address it originally allocated to the mobile node MH2. On receipt of the UUPD-Ack packet, the new access node BS3 takes tentative control of the DAG for the IP address of the mobile node.

The routing update associated with the inter-BS handover of the mobile station at the radio link layer is now complete, involving the redefinition of the height of only a limited number of nodes (In the example shown in FIG. 9, only five nodes) along the unicast update path. Furthermore, the updating of routing protocol data table entries is also limited, such updates only being required in the nodes receiving the UUPD message and each immediately adjacent node (which receive an advertisement of the new heights and store the new heights in their routing tables). In the example shown in FIG. 9, routing protocol data table updates are also performed in each of nodes IR1, CR1, CR2 and CR3.

Figure 10:
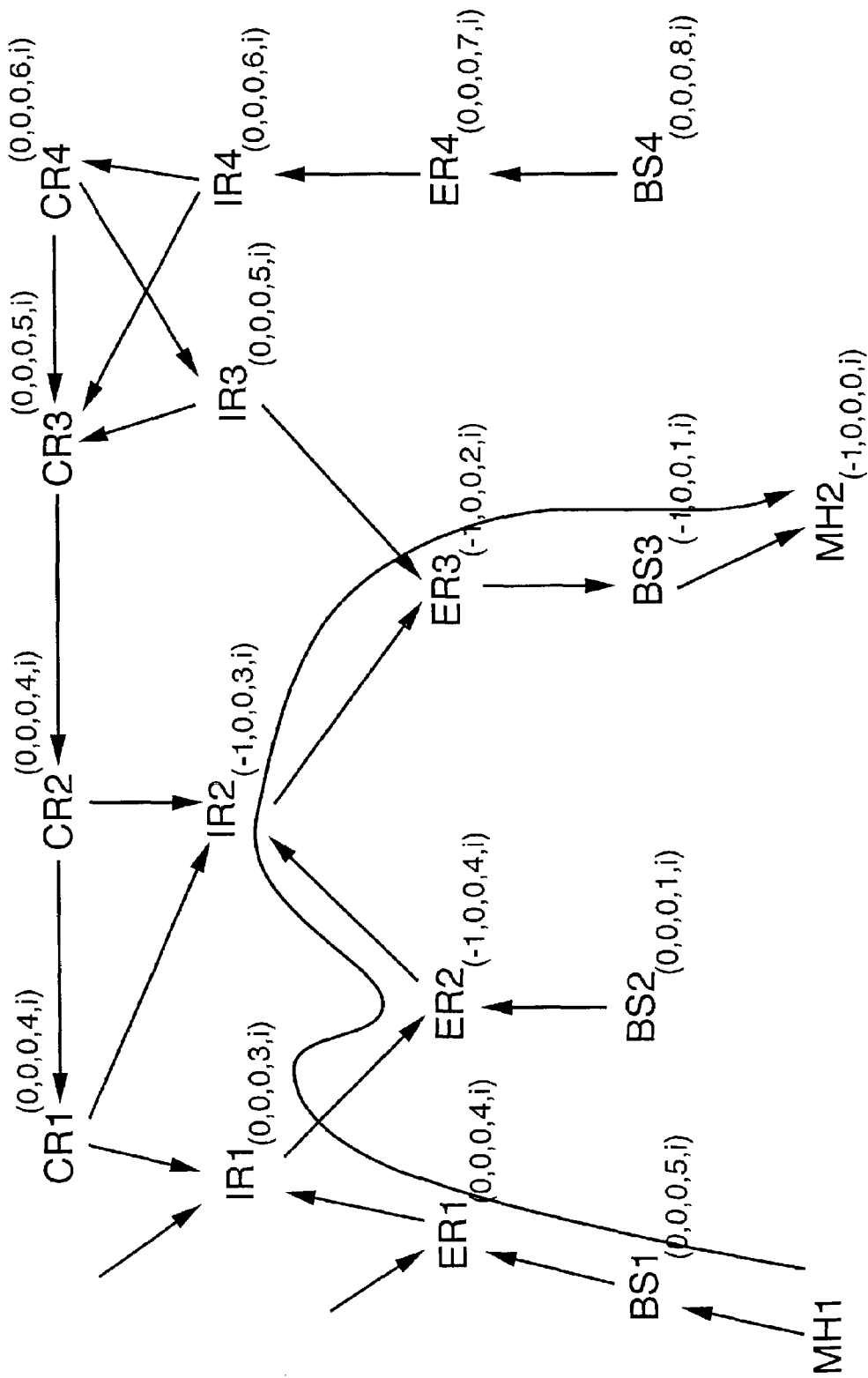
Figure 11:
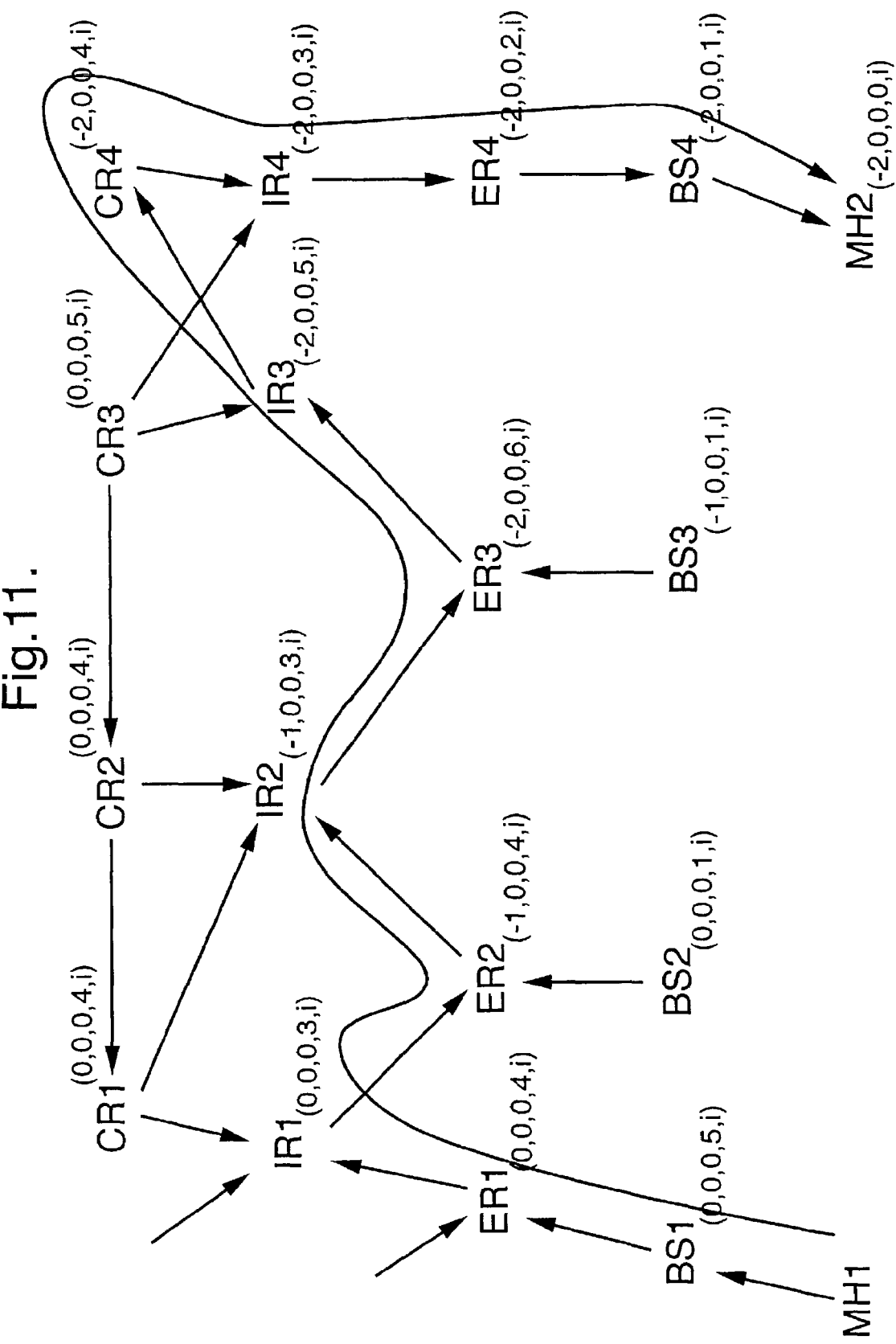

FIGS. 10 and 11 show the state of the DAG within the AS prior to, and following, a subsequent mobility-related update. In this case, the mobile node MH2 is handed over to a further access node BS4 from the access node BS3, to which the mobile node was previously handed over from access node BS2. The procedure employed is the same as that described in relation to the mobility-related update caused by the first handover of the mobile node from access node BS2 to access node BS3, except that the new height generated by the unicast update sent from the new access node BS4 include a further increment in the negative τ time value (which is increased in magnitude to −2), to differentiate the mobility-related updated heights caused by the second occurrence of mobility from the mobility-related updated heights of the first occurrence of mobility (having a τ time value of −1), and from the mobility-related updated heights from the heights assigned in the pre-computed DAG (having a τ time value of 0). As shown in FIG. 1, the nodes involved in the new update initially have heights including a τ time value of 0, indicating that the heights are as defined in the pre-computed DAG.

Figure 12:
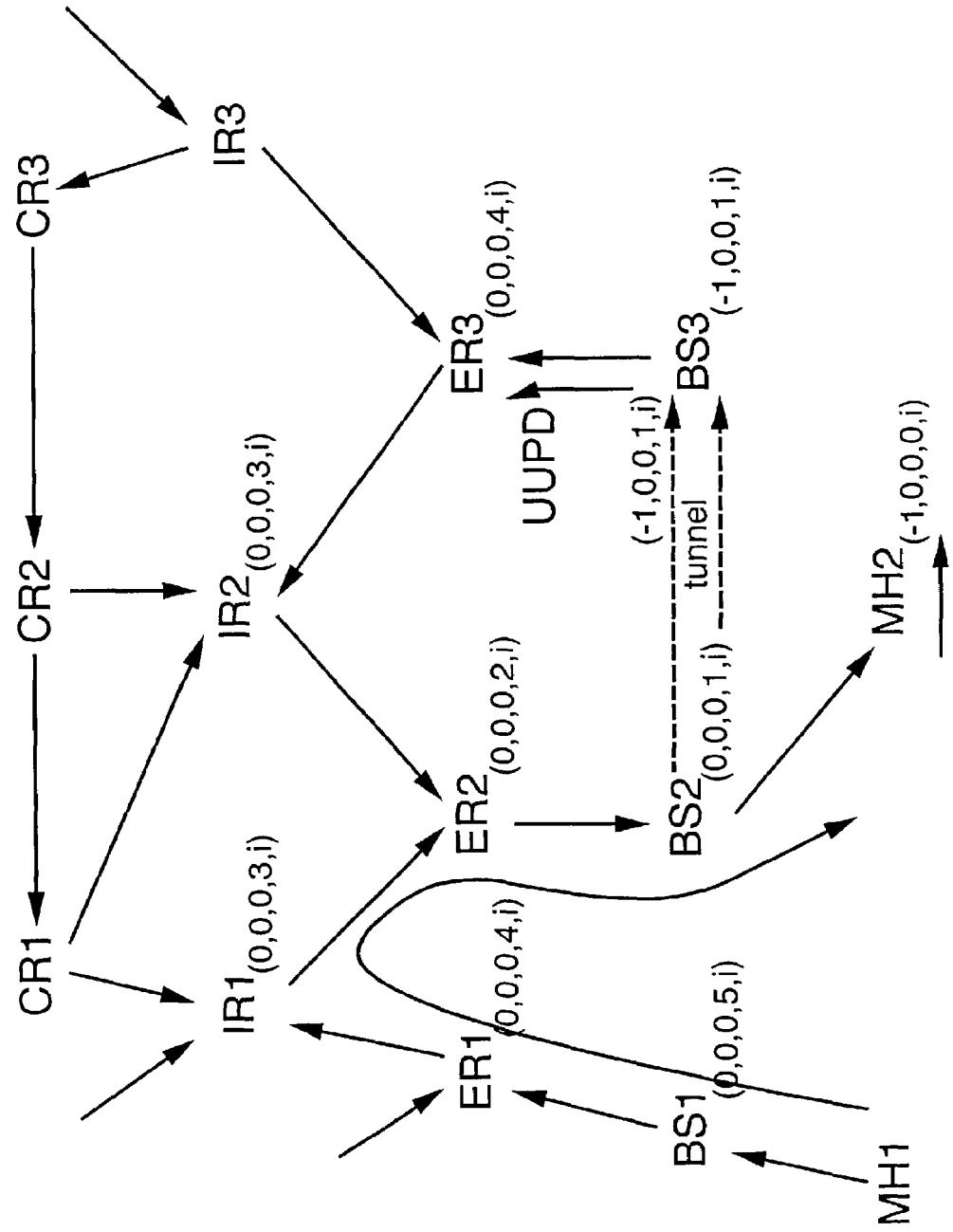
FIGS. 12 to 16 illustrate inter-base station handover and the accompanying routing updates in accordance with a further embodiment of the invention.

A further example of mobility-related routing updating, in which the mobile node is (as in a GSM cellular radio system) capable of communicating only via a single wireless link at any particular time, will now be described with reference to FIGS. 12 to 16. In this case, the steps described in relation to FIGS. 2 to 4 in the previous example are identical. As shown in FIG. 12, the UUPD packet sent from the new access node BS3 is generated in response to receipt of a TIN packet along the tunnel interface.

Figure 13:
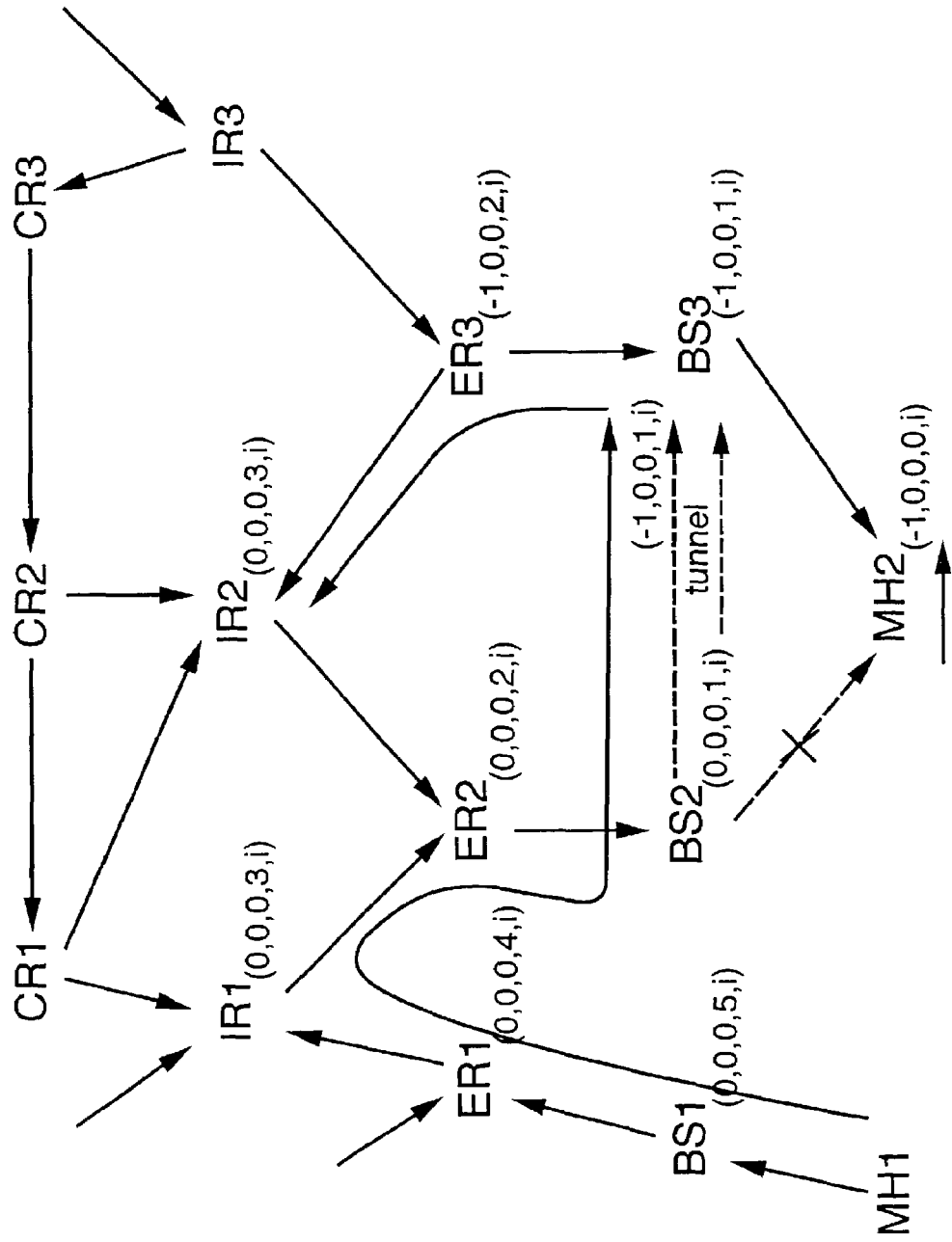
Figure 14:
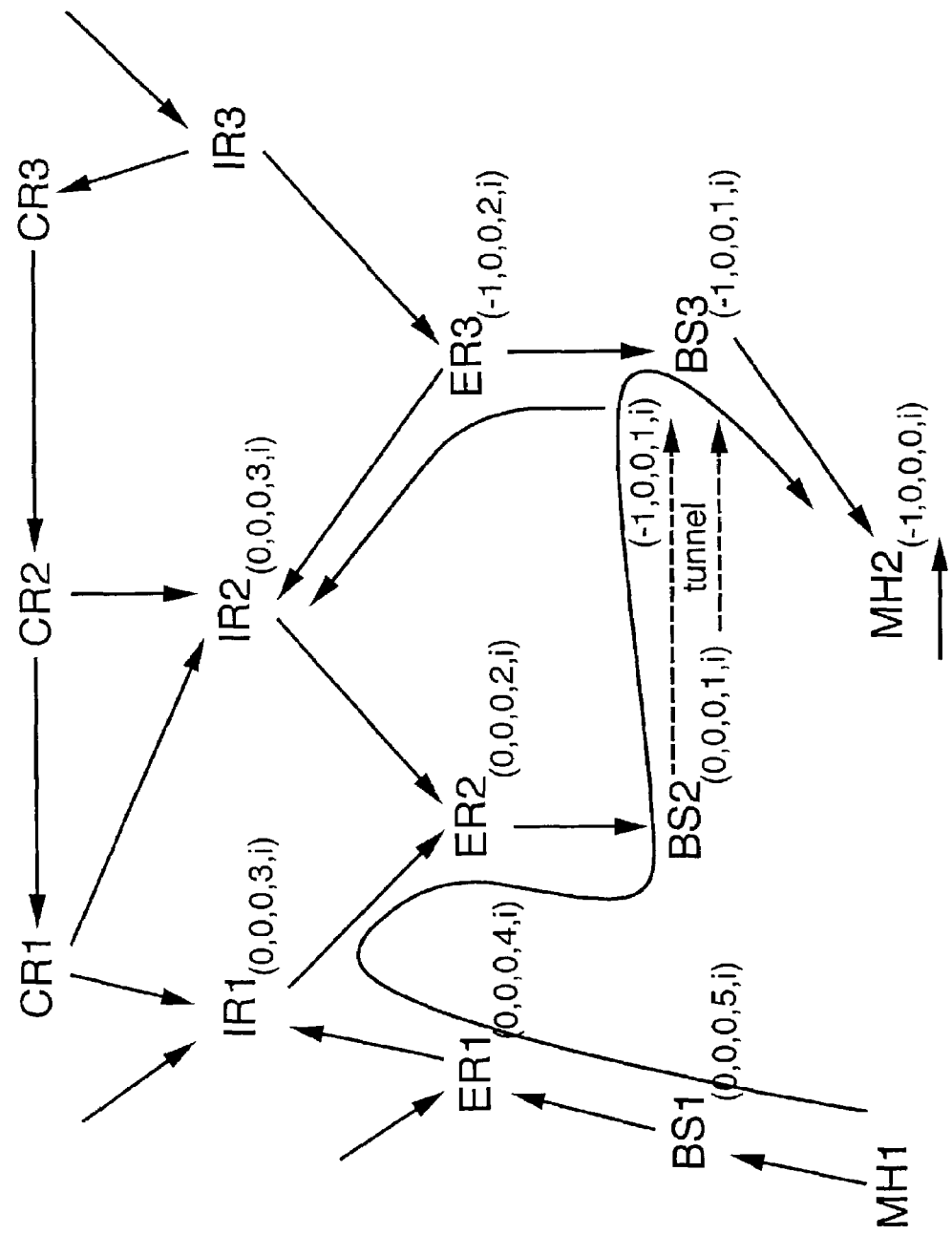
Figure 15:
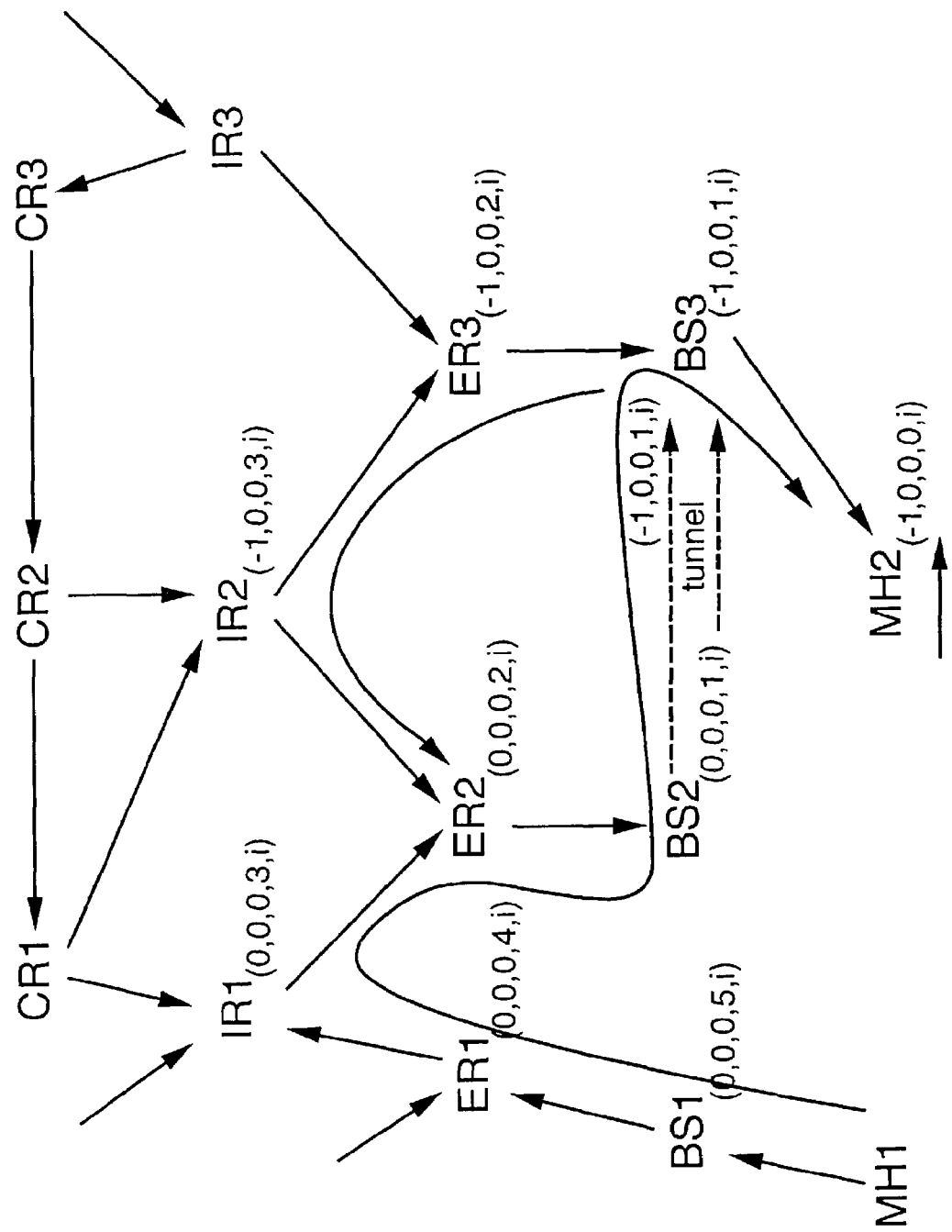
Figure 16:
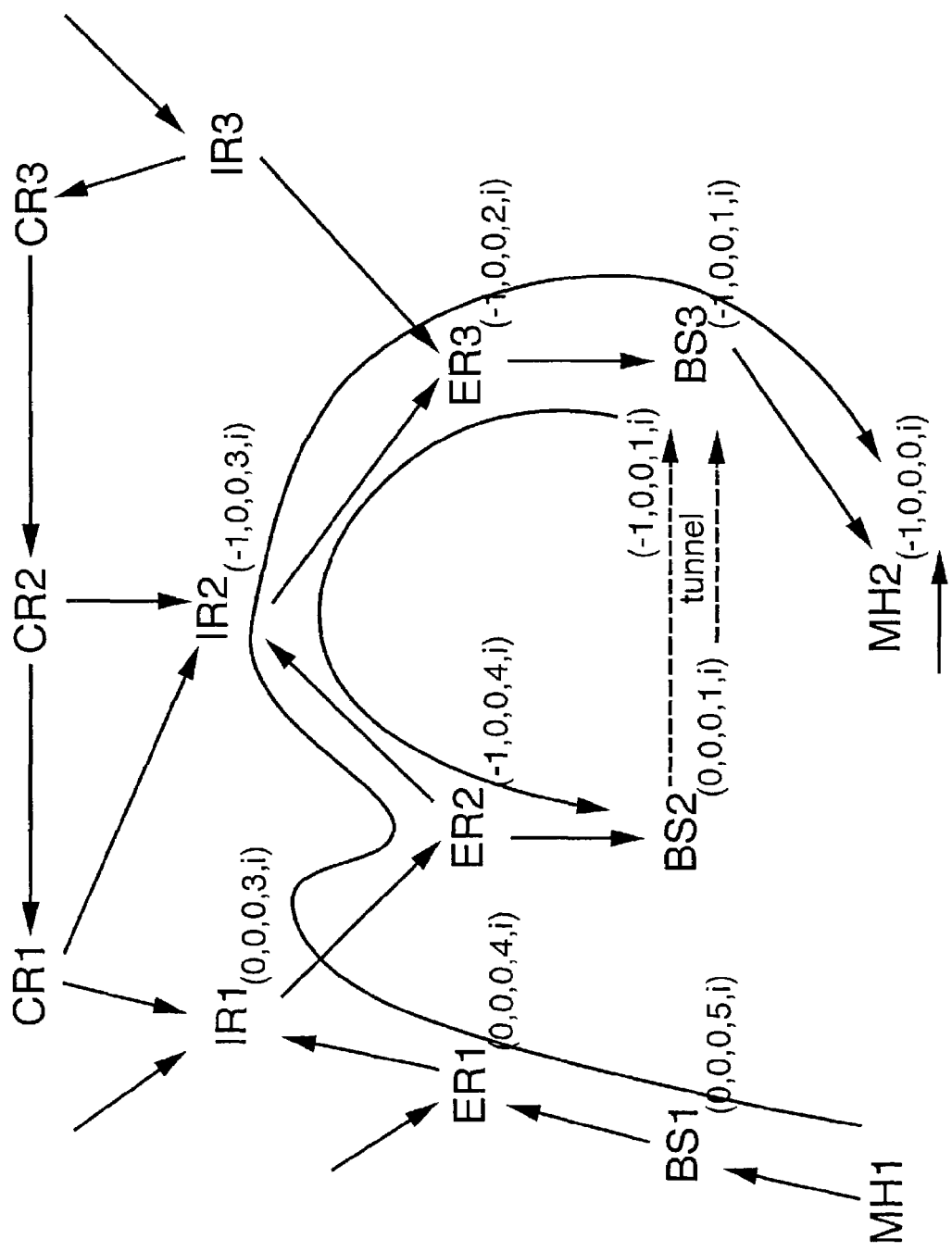

Referring now to FIG. 13, the mobile node MH2 first loses it wireless link with the home access node BS2, and a short time period elapses (to allow for re-synchronisation with the new access node BS3 at the wireless link layer, ETC) before the new wireless link with the new access node BS3 may be established. During the period that the mobile node MH2 has no wireless links, packets arriving at the home access node BS2 are forwarded by the tunnel interface from the home access node BS2 and are queued at the new access node BS3 until the new wireless link is established. Next, either the new wireless link is established or the UUPD packet arrives at the home access node BS2. If the new wireless link is established first, the new access node BS3 immediately assumes tentative control of the DAG for the IP address of the mobile node. Otherwise, the new access node BS3 waits until it receives the UUPD-Ack message from the home access node BS2. Remaining steps described in relation to the previous example (tunnel tear down, subsequent mobility, etc.) also apply in relation to the present example.

FIGS. 17 to 25 illustrate a procedure whereby, when a mobile node ends an access session, routing updates are performed which restore the DAG for the IP address of the mobile node to the condition of the DAG before the IP address was originally allocated to the mobile node. The routing update procedure involves routing updates being transmitted to only a limited number of nodes in the AS (along the paths along which unicast mobility-related updates were previously performed), and updates are required in the routing protocol data tables of only a limited number of nodes (the nodes along which the restored directed routing update messages pass and each immediately adjacent node).

Figure 17:
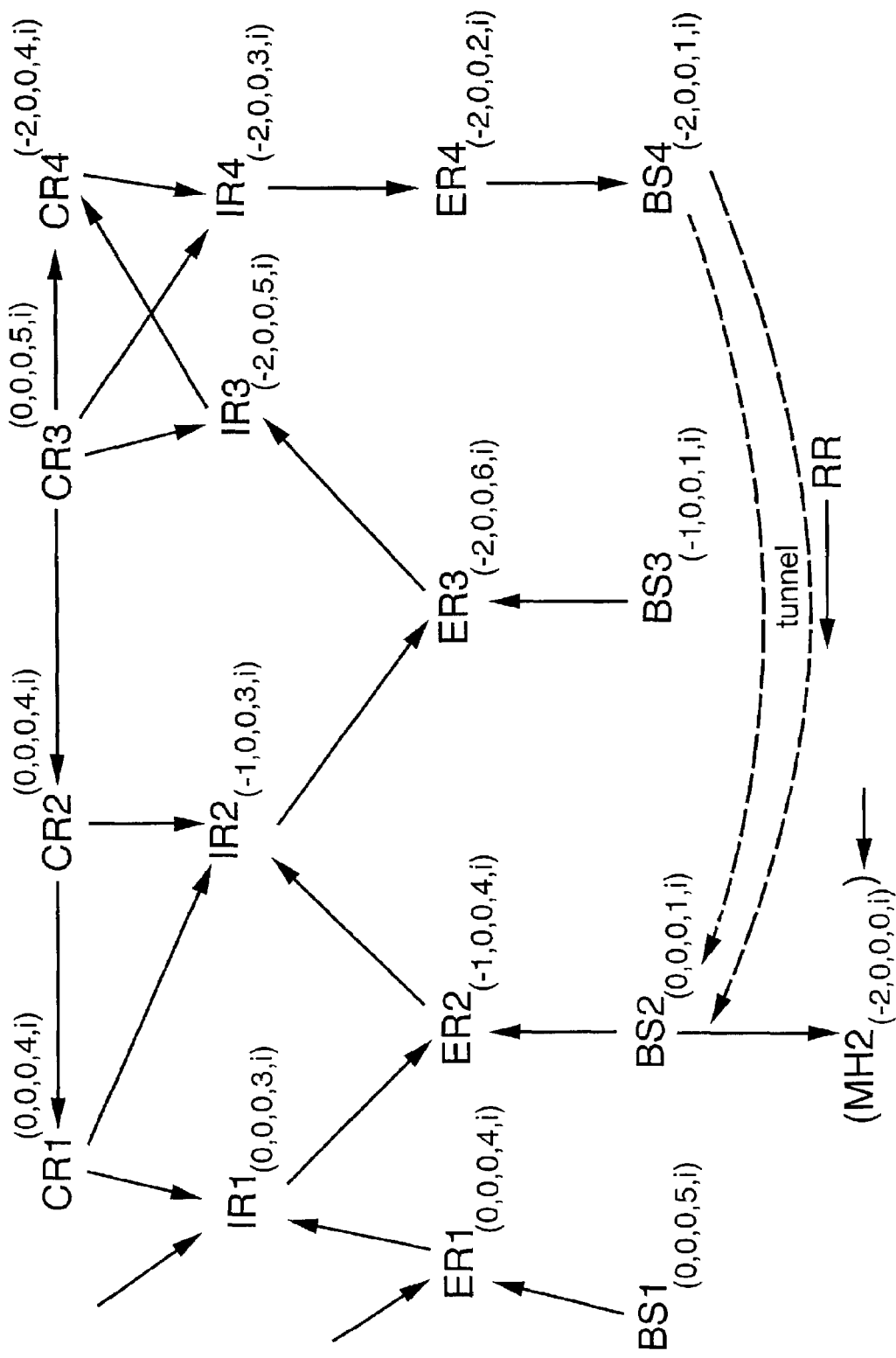
FIGS. 17 to 25 illustrate the restoration of routing to a home base station in accordance with an embodiment of the invention.

Referring to FIG. 17, when the mobile node MH2 ends the access session, the current access node BS4 transmits a restore request (RR) to the home access node BS2 for the IP address. This may be achieved by knowledge of the identity of the "home" access node for the IP address at the current access node. This knowledge can be provided by transmitting the identity of the owning BS when creating the aggregated DAG using the OPT packet update mechanism, and storing that identity as routing protocol data, in addition to the other routing protocol data held in the access nodes. This knowledge may alternately be provided by the mobile node storing the identity of the home BS when its IP address is first allocated, and transmitting this identity to each access node, for temporary storage therein, from which the mobile node receives service during its access session. Thus, when the mobile node MH2 ends this access session, the current access node BS4 transmits the RR packet, initially addressed with the IP address of the mobile node and encapsulated with the IP address of the home access node BS2, along an IP-in-IP tunnel link to the home access node BS2.

As an alternative to requiring knowledge of the identity of the home BS for an IP address, the RR packet may be transmitted with the mobile node's IP address as the destination address, however with an identifier in its header indicating to each forwarding node that the packet is to be routed along the aggregated DAG routing path, which remains directed at the home BS throughout the access session.

In response to receipt of the RR packet, home access node BS2 marks a downstream link in its routing tables to mobile host MH2. This downstream link is a virtual link, since the mobile host is currently not in wireless communications with any access node and is in fact located in a service area of a different access node (that of access node BS4). Any packet arriving at BS4 for the mobile node MH2 following the end of its access session may be forwarded along the tunnel to the home access node BS2, and may be stored for future forwarding to the mobile node MH2 when it begins a new access session.

Figure 18:
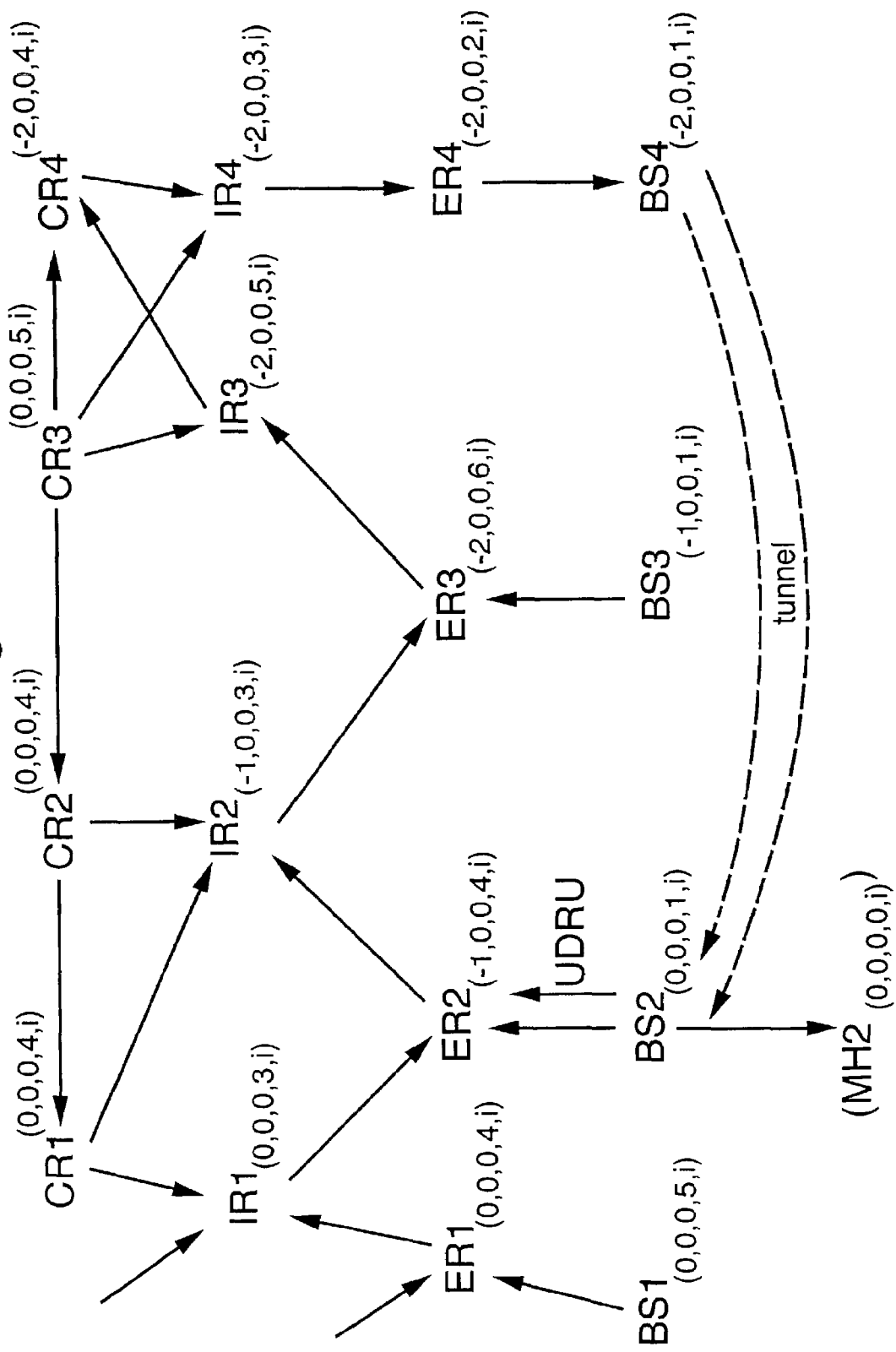
Figure 19:
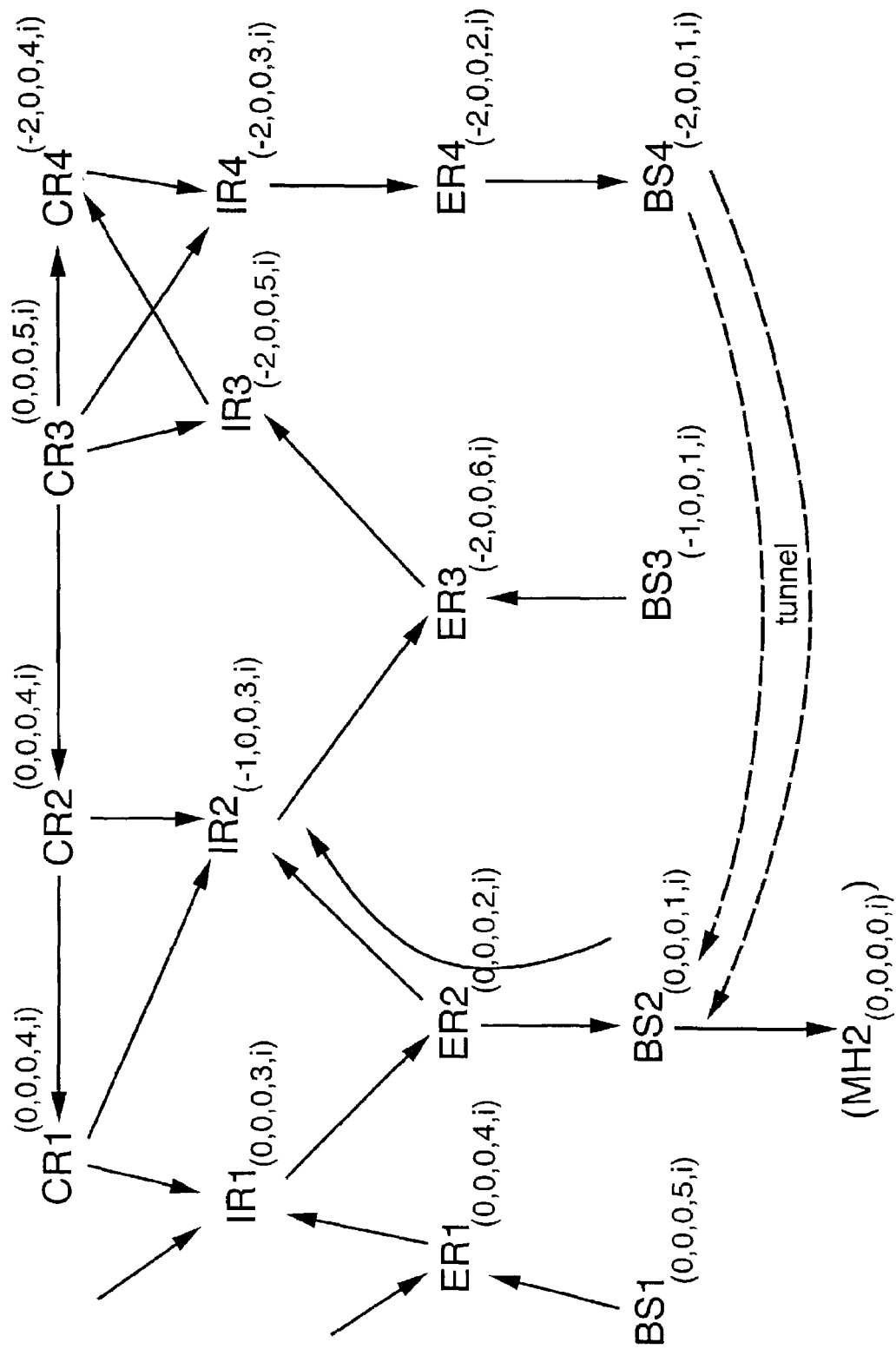

On receipt of the RR packet, the home access node BS2 also resets the height of the (now virtual) mobile node MH2 to an "all-zero" reference level, and sends a unicast-directed restore update (UDRU) packets towards the current access node BS4, via the fixed infrastructure of the AS, as illustrated in FIG. 18. The UDRU packet is forwarded along a unicast route, which includes only nodes having heights which were previously redefined as a result of mobility-related updating. In the example shown in FIG. 18, these nodes are nodes ER2, IR2, ER3, IR3, CR4, IR4, ER4 and BS4.

As the UDRU packet is received at each of the nodes along the unicast path, the TORA heights at each node are reset to an "all-zero" reference level, and the δ values of the heights are redefined so as to represent the number of hops to the (now virtual) mobile node via the home access node, in place of the previous entry values which indicated the number of hops to the mobile node via the current access node. This process is illustrated in each of FIGS. 18 to 22.

Figure 20:
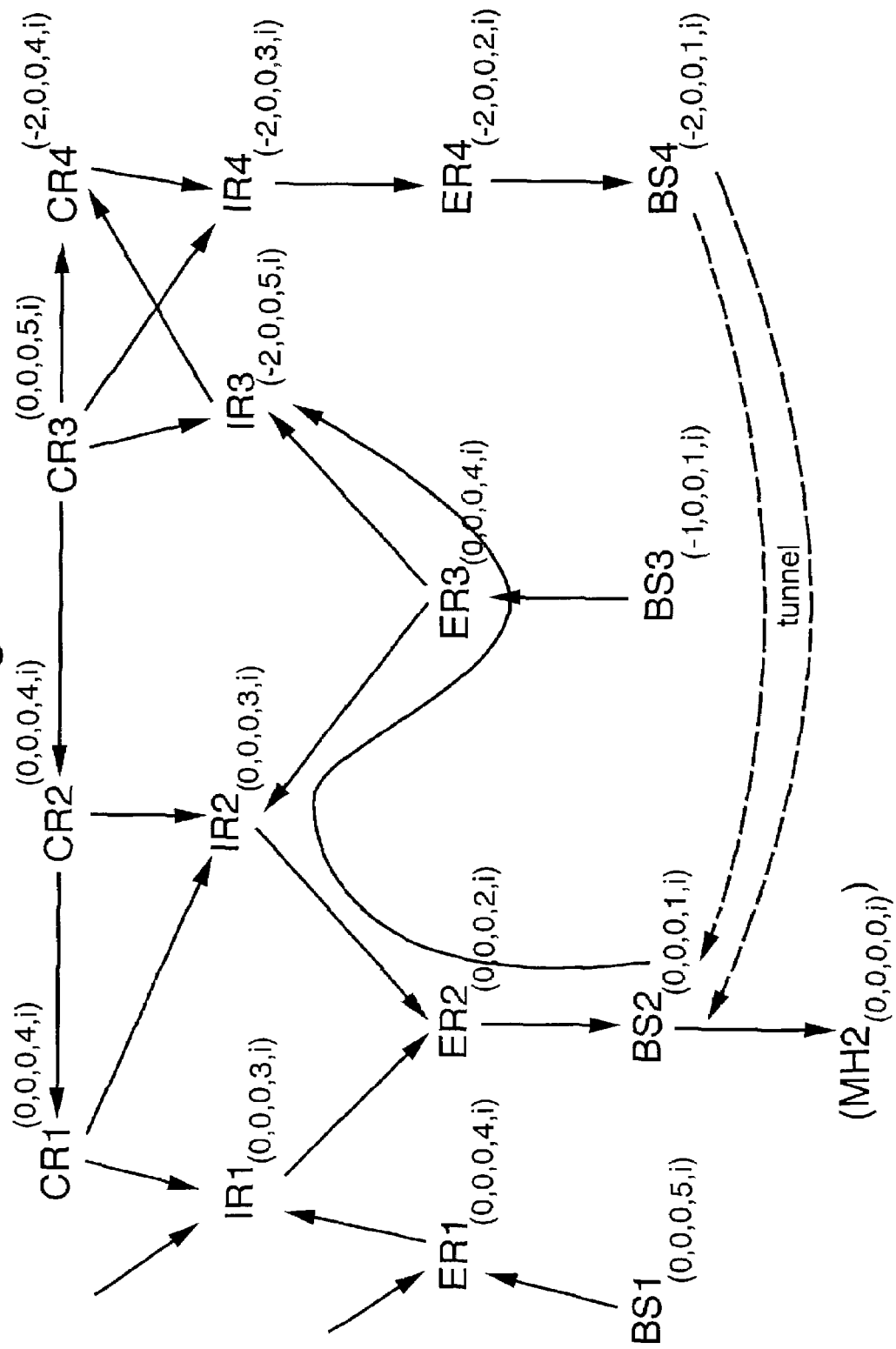
Figure 21:
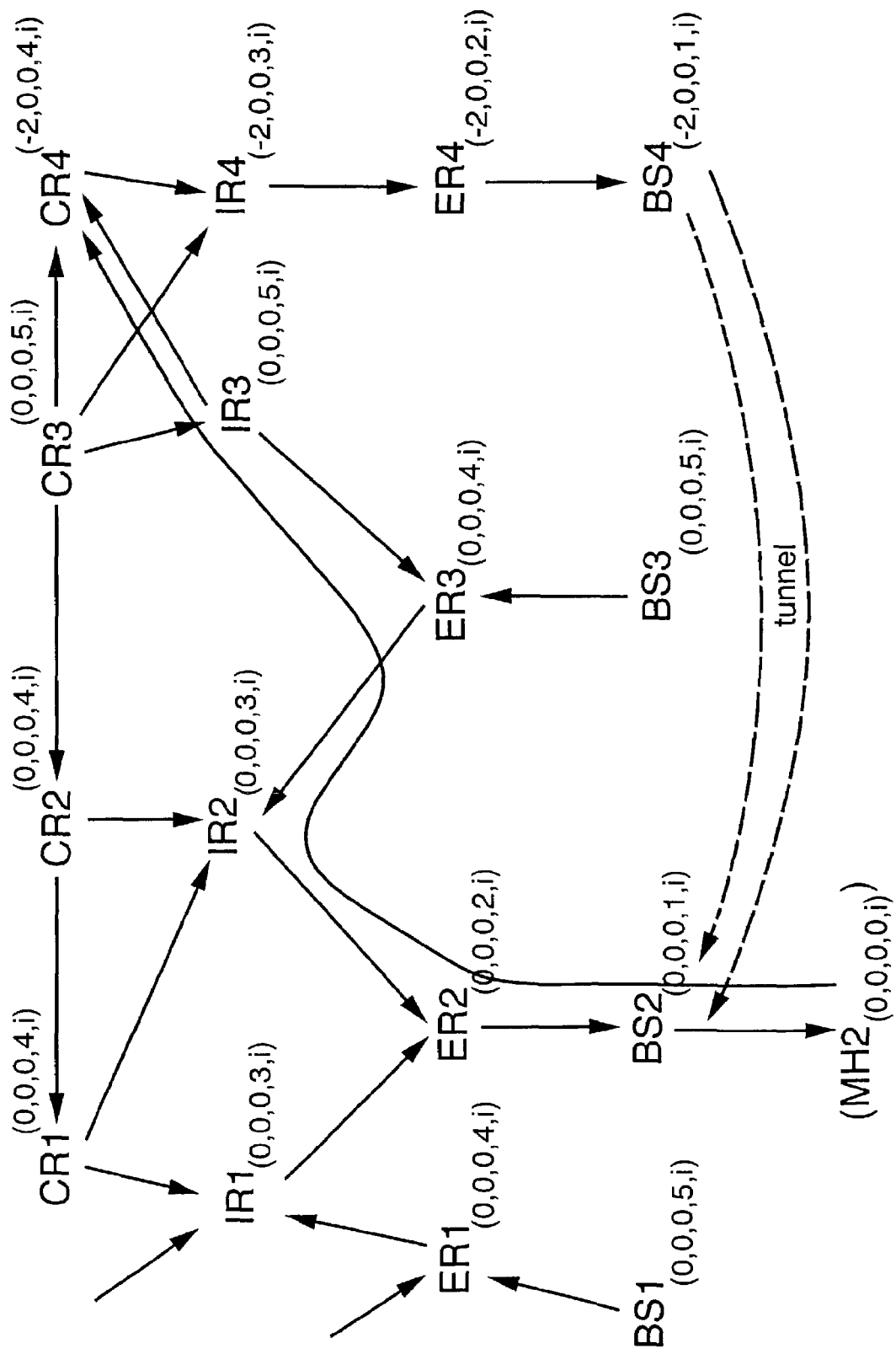
Figure 22:
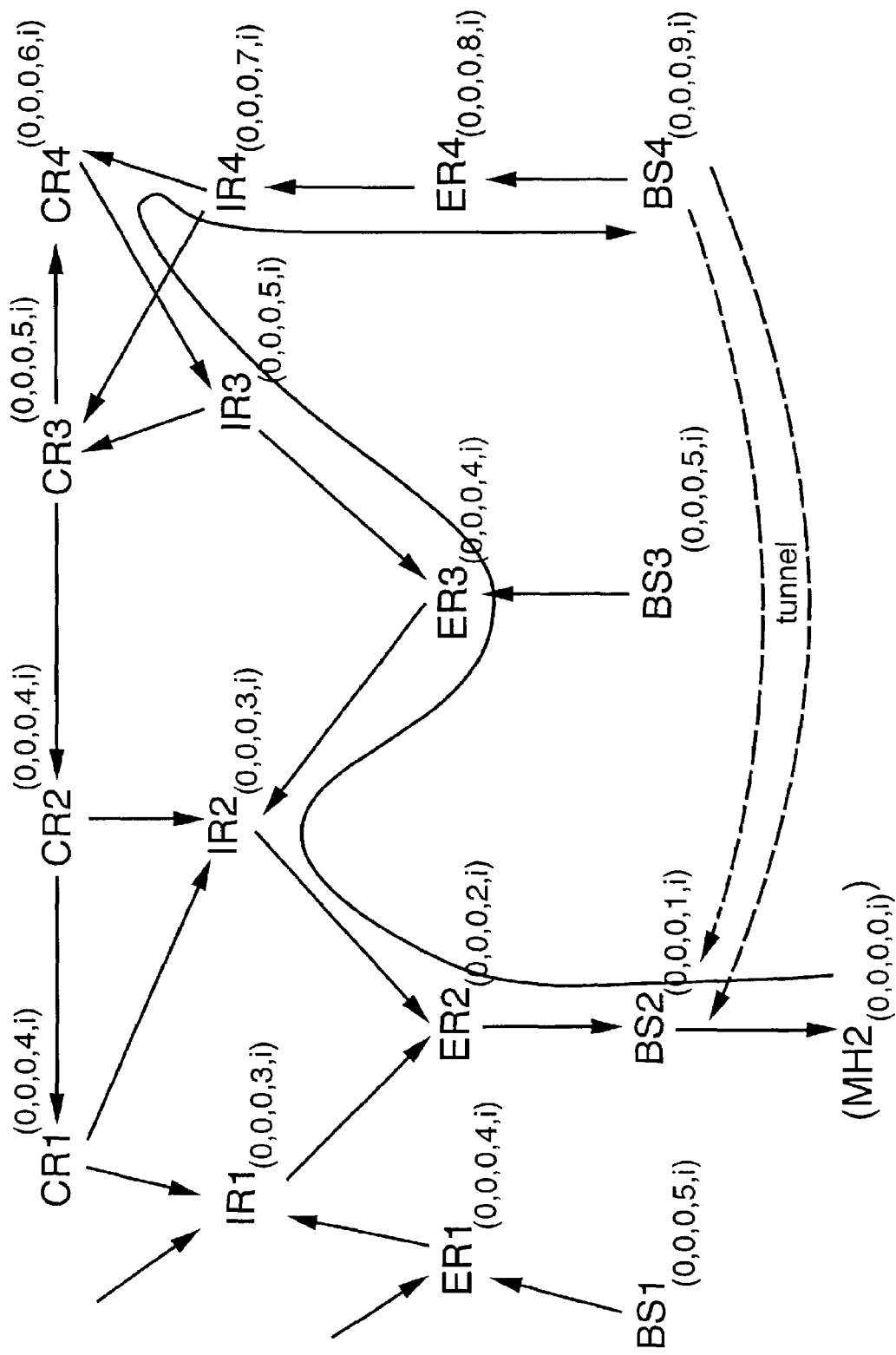

In addition to the updating of heights along the unicast update route, the updated heights are advertised to each immediately adjacent node. Any node having a negative τ time value in its own height which receives an advertisement indicating the resetting of a negative τ time value to 0, as in the case of access node BS3 (as illustrated in FIG. 20), also resets its own height to an "all-zero" reference level, defines its δ value to indicate the number of hops to the (now virtual) mobile station via the home access node, and generates an advertisement of its own new height and transmits it to all of its own neighbours. Any neighbours receiving an advertised new height which do not reset their own height do not propagate the advertisement any further.

Figure 23:
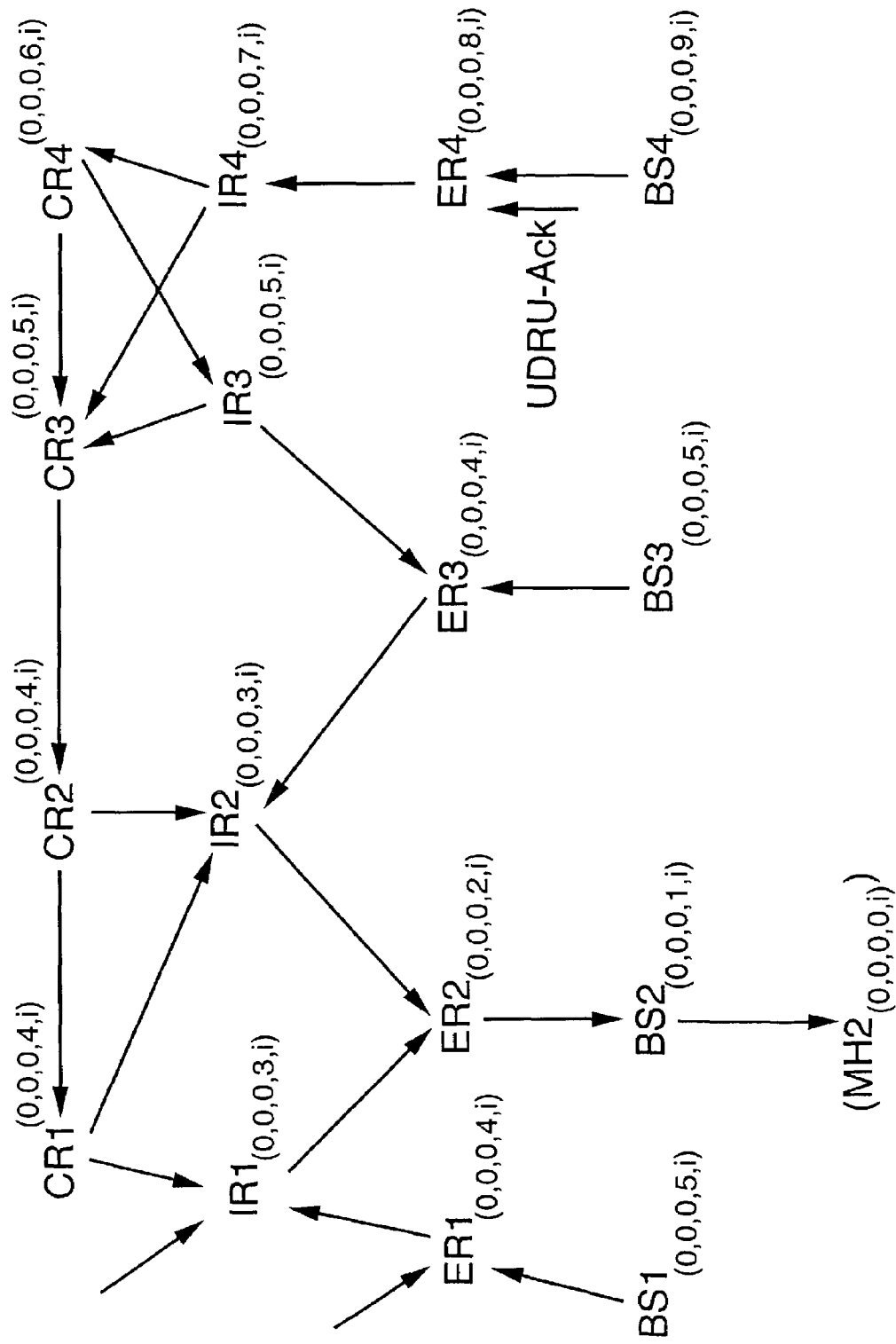

As illustrated in FIG. 23, once the UDRU packet is received at the current access node BS4, the current access node deletes the state associated with the mobile node MH2 in its routing tables and transmits a UDRU-Ack message, along the routing path just created by the unicast-update, towards the home access node BS2, thereby relinquishing tentative control of the DAG for the IP address previously used by the mobile node MH2.

Figure 24:
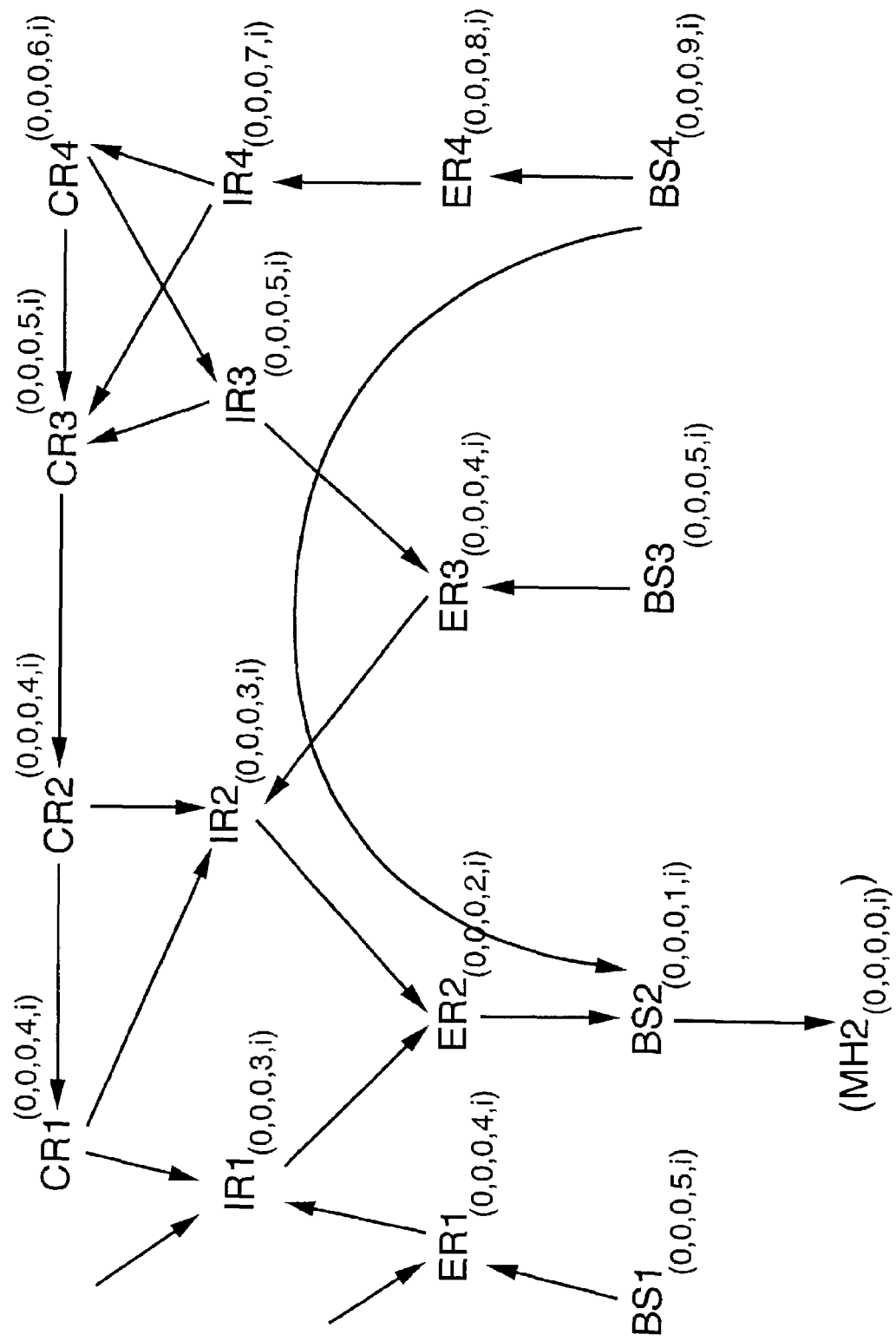
Figure 25:
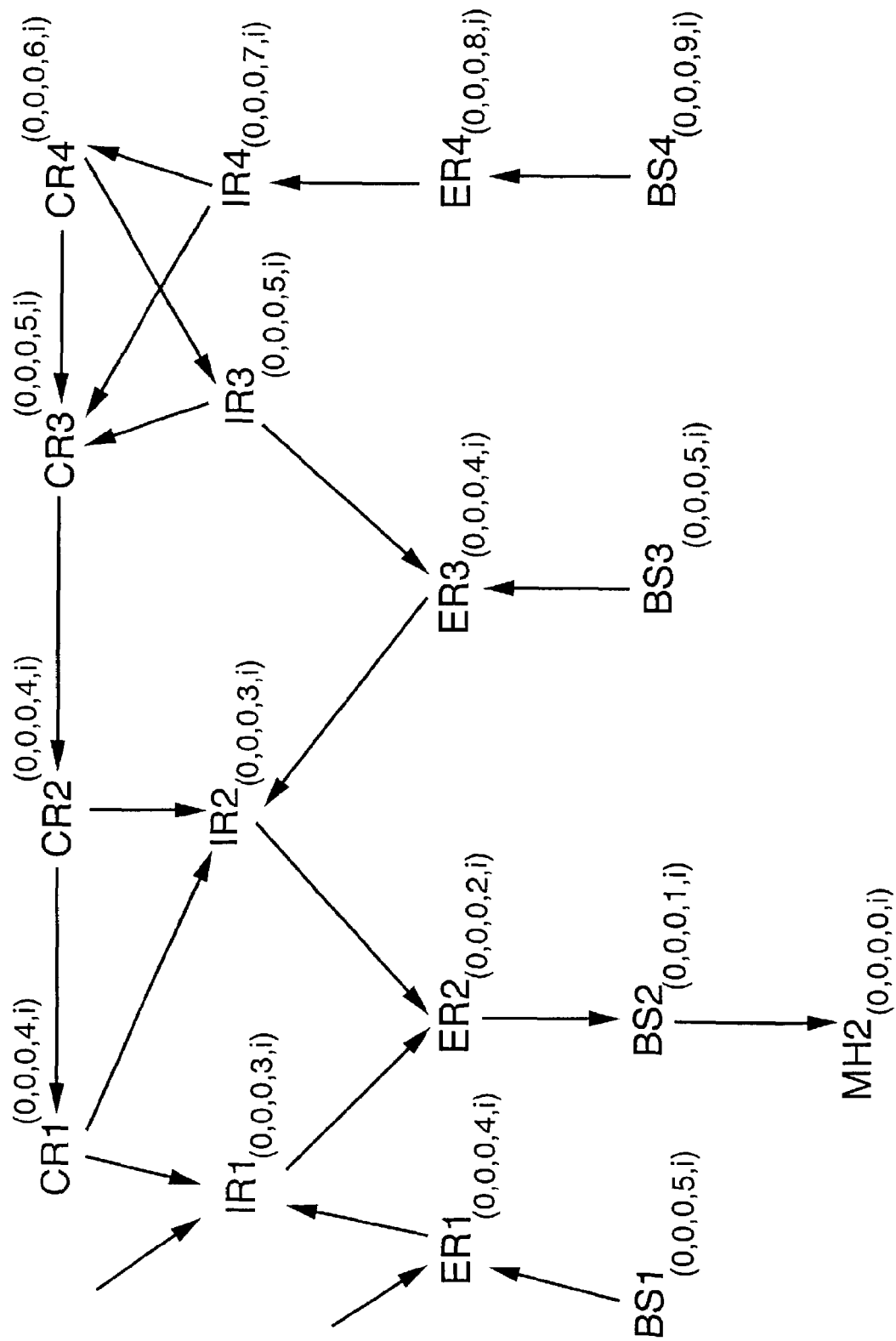

As shown in FIG. 24, the UDRU-Ack packet eventually propagates to the home access node BS2. On receipt, the home access node BS2 removes all state associated with the mobile node MH2 and assumes control of the DAG for the IP address. The IP address may then once again be dynamically allocated, to a different mobile node MH3 starting an access session in the service area of the access node BS2, as shown in FIG. 25.

What is claimed is:

1. A method of controlling routing of packets in a connectionless routing protocol network including an infrastructure of packet switching nodes interconnected by packet transport links, and a plurality of access nodes to which a routing path, defined by data held in packet switching nodes located along said routing path, may be directed in said infrastructure for a given network address, said method comprising:
routing packets along a first routing path for a first network address, which routing path is directed to a first access node serving a mobile node using said first network address via a communications link;
designating an interface, other than the communications link to the mobile node from the first access node, on which to forward packets arriving along said first routing path to a second access node;
subsequent to the designation of said interface, handing over the communications link of the mobile node, such that the second access node serves said mobile node;
responsive to the handing over of the communications link, altering routing in said infrastructure for said first network address to create a second routing path for said first network address, directed to said second access node; responsive to the creation of said second routing path, altering routing in said infrastructure for said first network address to remove said first routing path; and
routing packets to said second access node via said second routing path.

2. A method as in claim 1, wherein said designating step comprises designating a forward path from said first access node to said second access node for said first network address, said forward path not requiring routing in said infrastructure to be altered for said first network address.

3. A method as in claim 2, wherein said arriving packets are encapsulated and transmitted via a packet tunnel forming said forward path.

4. A method as in claim 3, wherein said packet tunnel is provided by tunneling via said infrastructure.

5. A method as in claim 2 wherein one or more control data packets for managing said routing alteration are transmitted via said forward path.

6. A method as in claim 5, wherein said one or more control data packets comprise a control data packet initiating said routing alteration at said second access node.

7. A method as in claim 2 wherein said forward path is designated by state data held in said first access node and related to said mobile node.

8. A method as in claim 7, said state data being removed from said first access node following propagation of a routing update to said first access node.

9. A method as in claim 8, wherein said state data is removed from said first access node in response to receipt of said routing update at said first access node.

10. A method as in claim 8 wherein said first access node transmits a routing update acknowledgement to said second access node in response to receipt of said routing update.

11. A method as in claim 7 wherein a time-out is associated with said state data, said state data being removed from said first access node following said time-out.

12. A method as in claim 1, wherein said interface is directed towards a cache local to said first access node.

13. A method as in claim 1, wherein said routing alteration comprises said second access node transmitting a routing update to said infrastructure.

14. A method as in claim 13, wherein said routing update is arranged to propagate via said infrastructure to said first access node.

15. A method as in claim 14, wherein said routing update is transmitted to said first access node as a unicast update.

16. A method as in claim 1, wherein said designating step is performed in response to receipt of a mobility request received from mobile node at said first access node.

17. A method as in claim 1, wherein said communications link is a wireless link.

18. A method as in claim 17, wherein the functionality of said wireless link allows said mobile node to receive data from only one of said first access node and said second access node during said handover.

19. A method as in claim 18, wherein said wireless link is a TDMA radio link.

20. A method as in claim 17, wherein the functionality of said wireless link allows said mobile node to receive data from both said first access node and said second access node during said handover.

21. A method as in claim 20, wherein said wireless link is a CDMA radio link.

22. A method as in claim 1, wherein said network address is an Internet Protocol (IP) address.

* * * * *